US012544663B2

(12) United States Patent
Zheng

(10) Patent No.: US 12,544,663 B2
(45) Date of Patent: Feb. 10, 2026

(54) METHOD, APPARATUS AND DEVICE FOR CONTROLLING VIRTUAL SKILLS IN VIRTUAL SCENE, MEDIUM AND PROGRAM PRODUCT

(71) Applicant: TENCENT TECHNOLOGY (SHENZHEN) COMPANY LIMITED, Shenzhen (CN)

(72) Inventor: Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 277 days.

(21) Appl. No.: 18/352,335

(22) Filed: Jul. 14, 2023

(65) Prior Publication Data

US 2023/0356080 A1 Nov. 9, 2023

Related U.S. Application Data

(63) Continuation of application No. PCT/CN2022/095187, filed on May 26, 2022.

(30) Foreign Application Priority Data

Jul. 8, 2021 (CN) ......................... 202110771587.6

(51) Int. Cl.
*A63F 13/52* (2014.01)
*A63F 13/58* (2014.01)

(52) U.S. Cl.
CPC .............. *A63F 13/52* (2014.09); *A63F 13/58* (2014.09)

(58) Field of Classification Search
CPC ...... A63F 13/40; A63F 13/422; A63F 13/426; A63F 13/2145
See application file for complete search history.

(56) References Cited

U.S. PATENT DOCUMENTS 6,165,073 A * 12/2000 Miyamoto .............. A63F 13/10 463/31
10,786,733 B2 * 9/2020 Tang ..................... A63F 13/422
(Continued)

FOREIGN PATENT DOCUMENTS

CN 110170168 A 8/2019
CN 111124226 A 5/2020
(Continued)

OTHER PUBLICATIONS

The World Intellectual Property Organization (WIPO) International Search Report for PCT/CN2022/095187 Aug. 4, 2022 5 Pages (including translation).
(Continued)

*Primary Examiner* — Chase E Leichliter
(74) *Attorney, Agent, or Firm* — Anova Law Group, PLLC

(57) ABSTRACT

Method for controlling virtual skills in a virtual scene includes: rendering a first virtual object and a skill identifier of a virtual skill of the first virtual object in the virtual scene; controlling, in response to a moving instruction for the skill identifier, the skill identifier to move in the virtual scene, the moving instruction being triggered by a joystick device; and during a moving process of the skill identifier, when a second virtual object exists in a target area, controlling the skill identifier to cling to the second virtual object, and when the virtual skill is released in a process of the skill identifier clinging to the second virtual object, controlling the virtual skill to act on the second virtual object.

19 Claims, 15 Drawing Sheets

(56) References Cited

U.S. PATENT DOCUMENTS

2002/0103031 A1* 8/2002 Neveu .................. A63F 13/537 463/49
2006/0111182 A1* 5/2006 Nakanishi ............ A63F 13/426 463/36
2006/0252531 A1* 11/2006 Kando ................. A63F 13/335 463/36
2006/0258443 A1* 11/2006 Moro ................. A63F 13/2145 463/30
2008/0026843 A1* 1/2008 Nakasaka .......... A63F 13/2145 463/37
2010/0004041 A1* 1/2010 Shindo .................... A63F 13/42 463/36
2010/0240429 A1* 9/2010 Chosogabe ............ A63F 13/56 463/43
2010/0267435 A1* 10/2010 Taya ....................... A63F 13/45 463/2
2010/0267436 A1* 10/2010 Lee ....................... A63F 13/833 463/8
2011/0039618 A1* 2/2011 Ichiyanagi ............ A63F 13/837 463/31
2012/0178531 A1* 7/2012 Yamada ................ A63F 13/537 463/33
2012/0327106 A1* 12/2012 Won ...................... A63F 13/843 345/173
2013/0288790 A1* 10/2013 Wang .................. A63F 13/2145 463/31
2013/0316813 A1* 11/2013 Derome .............. A63F 13/2145 463/31
2013/0316817 A1* 11/2013 Tanzawa ............... G06F 3/0481 463/31
2014/0121012 A1* 5/2014 Tagawa ................... A63F 13/00 463/31
2015/0157932 A1* 6/2015 Kwon .................... G06Q 50/00 463/31
2015/0273343 A1* 10/2015 Watabe ................... A63F 13/00 463/31
2016/0124518 A1* 5/2016 Takahashi ........... G06F 3/04817 463/31
2016/0129345 A1* 5/2016 Seok ..................... A63F 13/213 463/31
2016/0199728 A1* 7/2016 Yoon ..................... G06F 3/0488 463/37
2017/0072311 A1* 3/2017 Maejima ................. A63F 13/42
2017/0340959 A1* 11/2017 Tang ..................... G06F 3/0488
2017/0368462 A1 12/2017 Jo et al.
2018/0024660 A1* 1/2018 Wang .................. G06F 3/04817 273/110
2018/0028914 A1* 2/2018 Yamaguchi ............. A63F 13/92
2018/0147488 A1* 5/2018 Tang ..................... A63F 13/422
2018/0185747 A1* 7/2018 Li ........................... A63F 13/58
2018/0200616 A1* 7/2018 Li ......................... A63F 13/214
2021/0275914 A1 9/2021 Wu et al.
2023/0347254 A1 11/2023 Jo et al.
2023/0356080 A1* 11/2023 Zheng ..................... A63F 13/58
2024/0091654 A1 3/2024 Wu et al.
2024/0143145 A1 5/2024 Wan et al.

FOREIGN PATENT DOCUMENTS

CN 111185007 A 5/2020
CN 111672119 A 9/2020
CN 113440852 A 9/2021
JP 2003245465 A 9/2003
JP 2014000435 A 1/2014
JP 2015516864 A 6/2015
JP 2019080742 A 5/2019
WO 2020173256 A1 9/2020

OTHER PUBLICATIONS

The Japan Patent Office (JPO) Notice of Reasons for Refusal for Application No. 2023-561215 Oct. 7, 2024 10 Pages (including translation).

* cited by examiner

METHOD, APPARATUS AND DEVICE FOR CONTROLLING VIRTUAL SKILLS IN VIRTUAL SCENE, MEDIUM AND PROGRAM PRODUCT

RELATED APPLICATIONS

This application is a continuation application of PCT Patent Application No. PCT/CN2022/095187, filed on May 26, 2022, which claims priority to Chinese Patent Application No. 202110771587.6 filed on Jul. 8, 2021, all of which is incorporated by reference in their entirety.

FIELD OF THE TECHNOLOGY

The present disclosure relates to computer processing and human-computer interaction techniques, and more particularly relates to a method, apparatus and device for controlling virtual skills in a virtual scene, a computer-readable storage medium and a computer program product.

BACKGROUND OF THE DISCLOSURE

In most of current virtual scene applications (e.g., in a multiplayer online battle arena, MOBA) based on game consoles (e.g., a handheld game console), a joystick device may be used to control release a virtual skill to assist a player in interaction with an opponent. In a process of controlling virtual skill to release through the joystick device, a release position or a release direction of the virtual skill can be controlled, for example, when a skill identifier corresponding to the virtual skill aims at a target, the virtual skill can be released to act on the target.

However, in some cases, the joystick device is used for aiming at the target. Due to limitations of a physical mechanism of the joystick device, the player cannot accurately aim at the target through the joystick device, and whether the player or the target moves, the release position or direction of the virtual skill cannot be accurately controlled further. Consequently, in order to achieve a purpose of aiming, the player needs to execute multi-time interactive operations, and thus human-computer interaction efficiency is low, which delays the game duration, increases the burden of an electronic device for processing one-round game, and causes a low hardware resource utilization rate.

SUMMARY

One aspect of the present disclosure provides a method for controlling virtual skills in a virtual scene, executed by an electronic device. The method includes rendering a first virtual object and a skill identifier of a virtual skill of the first virtual object in the virtual scene; controlling, in response to a moving instruction for the skill identifier, the skill identifier to move in the virtual scene, the moving instruction being triggered by a joystick device; and during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object.

Another aspect of the present disclosure provides an electronic device. The electronic device includes a memory, configured to store executable instructions; and a processor, configured to execute the executable instructions stored in the memory to implement a method for controlling virtual skills in a virtual scene. The method includes rendering a first virtual object and a skill identifier of a virtual skill of the first virtual object in the virtual scene; controlling, in response to a moving instruction for the skill identifier, the skill identifier to move in the virtual scene, the moving instruction being triggered by a joystick device; and during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object.

Another aspect of the present disclosure provides a non-transitory computer-readable storage medium, storing executable instructions which are executed by a processor to implement a method for controlling virtual skills in a virtual scene. The method includes rendering a first virtual object and a skill identifier of a virtual skill of the first virtual object in the virtual scene; controlling, in response to a moving instruction for the skill identifier, the skill identifier to move in the virtual scene, the moving instruction being triggered by a joystick device; and during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object.

DESCRIPTION OF EMBODIMENTS

Figure 1:
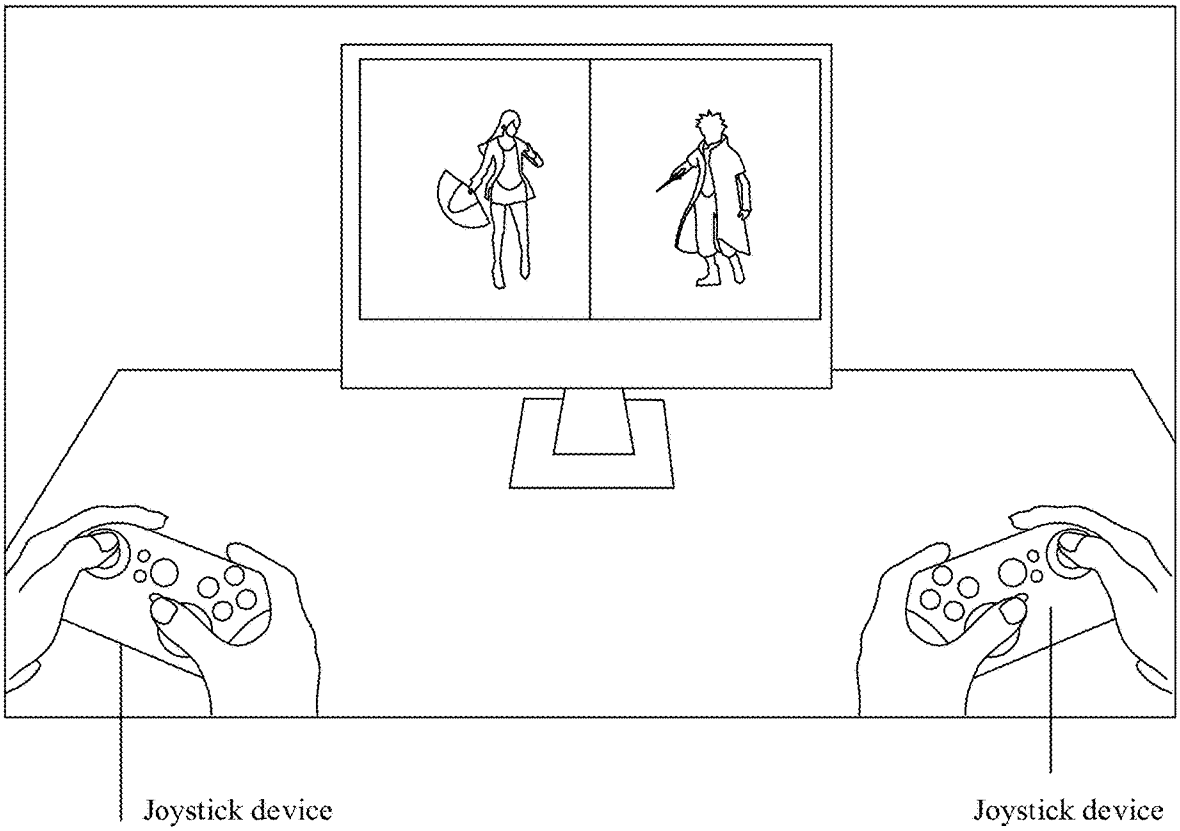
FIG. 1 is a schematic diagram of an interface of a virtual scene according to an embodiment of the present disclosure.

To make the objectives, technical solutions, and advantages of the present disclosure clearer, the following describes the present disclosure in detail with reference to drawings. The described embodiments are not to be considered as a limitation to the present disclosure. All other embodiments obtained by those of ordinary skill in the art without creative efforts shall fall within the scope of protection of the present disclosure.

In the following description, the term "some embodiments" is involved and describes subsets of all suitable embodiments, but it may be understood that "some embodiments" may be the same subset or different subsets of all the suitable embodiments, and can be combined with one another when there are no conflicts.

In the following description, the involved terms "first/second . . . " are merely intended to distinguish similar objects rather than represent a particular sequence specific to objects. It is to be understood that under the allowable situation, a particular sequence or precedence of "first/second . . . " can be exchanged so that the described embodiments of the present disclosure can be implemented in sequence except the sequence illustrated or described herein.

Unless otherwise defined, meanings of all technical and scientific terms used herein are the same as those usually understood by those skilled in the art to which the present disclosure belongs. The terms used herein are merely intended to describe objectives of the embodiments of the present disclosure, but not intended to limit the present disclosure.

Embodiments of the present disclosure provide a method, apparatus and device for controlling virtual skills in a virtual scene, and a computer-readable storage medium, which can improve aiming efficiency, human-computer interaction efficiency and a hardware resource utilization rate.

Before the embodiments of the present disclosure are described in detail, a description is made on terms in the embodiments of the present disclosure, and the terms in the embodiments of the present disclosure are applied to the following explanations.

1) A client is an application program running on a terminal and configured to provide various services, such as a video play client and a game client.

2) Response is used for representing a condition or status on which an executed operation depends, and when the dependent condition or status is satisfied, one or more executed operations may be real-time, or may have set delay; and there is no limitation on the execution sequence of the plurality of executed operators, unless particularly specified.

3) A virtual scene is a virtual scene displayed (or provided) by an application program running on the terminal, which may be a simulation environment for a real world, or may be a semi-simulation semi-imaginary virtual environment, or may be a purely-imaginary virtual environment. The virtual scene may be any one of a two-dimensional virtual scene, a 2.5-dimensional virtual scene or a three-dimensional virtual scene, and the embodiment of the present disclosure does not limit the dimension of the virtual scene.

For example, when the virtual scene is a three-dimensional virtual space, the three-dimensional virtual space may be an open space, and the virtual scene can be used for simulating a real environment in reality, which may include sky, land, ocean, etc., and the land may include desert, city and other environmental elements. Of course, the virtual scene may further include virtual items, such as buildings, carriers, weapons required to arm a virtual object in the virtual scene or to fight with other virtual objects, and other props, and the virtual scene may be further used for simulating real environments in different weathers, such as sunshine, rain, fog or night. A user can control the virtual object to move in the virtual scene.

4) The virtual object represents various interactive person and object figures in the virtual scene, or movable objects in the virtual scene. The movable objects may be virtual characters, virtual animals, cartoon characters, etc., such as: characters, animals, plants, oil drums, walls and stone displayed in the virtual scene. The virtual object may be a virtual figure for representing the user in the virtual scene. The virtual scene may include a plurality of virtual objects, and each virtual object has a shape and a volume in the virtual scene, and occupies some space in the virtual scene.

In some embodiments, the virtual object may be a user character controlled by operations on the client, or may be artificial intelligence (AI) set in virtual scene fight through training, or may be a non-player character (NPC) set in virtual scene interaction. In some embodiments, the virtual object may be a virtual character performing adversarial interaction in the virtual scene. In some embodiments, the number of virtual objects for interaction in the virtual scene may be preset, or may be dynamically determined according to the number of clients joining interaction.

Using a shooting game as an example, in the virtual scene, the user may control the virtual object to fall freely, glide, or fall after a parachute is opened in the sky, or to run, jump, creep, or bend forward in the land; or may control the virtual object to swim, float, or dive in the ocean. Certainly, the user may further control the virtual object to take a virtual carrier to move in the virtual scene. For example, the virtual carrier may be a virtual automobile, a virtual aircraft, a virtual yacht, etc., and the scenes are used as an example only herein, which are not specifically limited in the embodiments of the present disclosure. The user may also control the virtual object to perform adversarial interaction with other virtual objects through the virtual props or virtual skills. For example, the virtual props may be a grenade, a cluster grenade, a sticky grenade and other throwing virtual props, and may also be a machine gun, a pistol, a rifle and other shooting virtual props. The virtual skills may be attacking skills, defensive skills and other types. The present disclosure does not limit control types for the virtual props or the virtual skills in the virtual scene.

5) The virtual skills are various special functions assisting a target virtual object in the virtual scene to interact with other virtual objects. There are many types of virtual skills, such as the attack skills assisting the target virtual object to attack other virtual objects, or the defensive skills assisting the target virtual object to defend other virtual objects.

Each virtual skill corresponds to a corresponding release condition. For example, a point-selecting type virtual skill is a skill which can be successfully released only at a point of action selected by the player in a map of the virtual scene. A direction type skill is a skill which can be successfully released in one direction where the player moves.

In application of the virtual scene, for example, when a multiplayer online battle arena (MOBA) is played based on a game console (e.g., a handheld game console), skill aiming assistant in games like depression angle action games is implemented by an operation mode of pressing a standalone-game-based skill button for releasing, but the mode cannot be used in the MOBA with a high competitive attribute. Some handheld game consoles with depression angle action games only simply simulate a mobile phone version aiming mode, an operation mode of the handheld game consoles is not further optimized, and thus, when the handheld game console controls a virtual skill release position or release direction through a joystick device, the joystick device is hard to accurately operate, and as a result, the accuracy of aiming a target in the mode is not high. For example, for a direction type virtual skill, assuming that the target is in a 30-degree direction, which requires the joystick device to be controlled in the 30-degree direction, but the final orientation of the joystick device may be a value between 25 degrees and 35 degrees, and the 30-degree direction is hard to accurately position, resulting in an angular deviation in target aiming.

For another example, for the point-selecting type virtual skill, FIG. 1 is a schematic diagram of an interface of a virtual scene illustrating an aiming operation according to an embodiment of the present disclosure. When a joystick device controls virtual scene application, due to a physical mechanism of the joystick device, fast aiming and accurate aiming cannot be accurately unified when a skill identifier is controlled to position a target, meanwhile, a player cannot directly perceive, through the joystick device, the position of the skill identifier in a screen, and it is very difficult to control the skill identifier to accurately position the target, particularly for a dynamic target constantly changing; and the player needs to further rotate a joystick many times to aim at the target, the aiming efficiency is low, and particularly for a new player, operation difficulty is high.

Thus, the embodiments of the present disclosure provide a method, apparatus and device for controlling virtual skills in a virtual scene, and a computer-readable storage medium, which can rapidly and accurately position a target and improve target aiming efficiency. An exemplary application of an electronic device provided by an embodiment of the present disclosure is described below. The electronic device provided by the embodiment of the present disclosure may be implemented as a notebook computer, a tablet personal computer, a desk computer, a set top box, a mobile device (e.g., a mobile telephone, a portable music player, a personal digital assistant and a portable game device) and other various types of user terminals. The exemplary application of the electronic device being implemented as the terminal is described below.

For easier understanding of the method for controlling virtual skills in a virtual scene according to the embodiment of the present disclosure, an exemplary implementation scene of the method for controlling virtual skills in a virtual scene according to the embodiment of the present disclosure is first described. In some embodiments, the virtual scene may be an environment where virtual objects interact, such as an environment where the virtual objects can fight in the virtual scene, mutual interaction can be performed in the virtual scene by controlling actions of the virtual objects, thereby enabling users to relief life pressure in the game process.

Figure 2A:
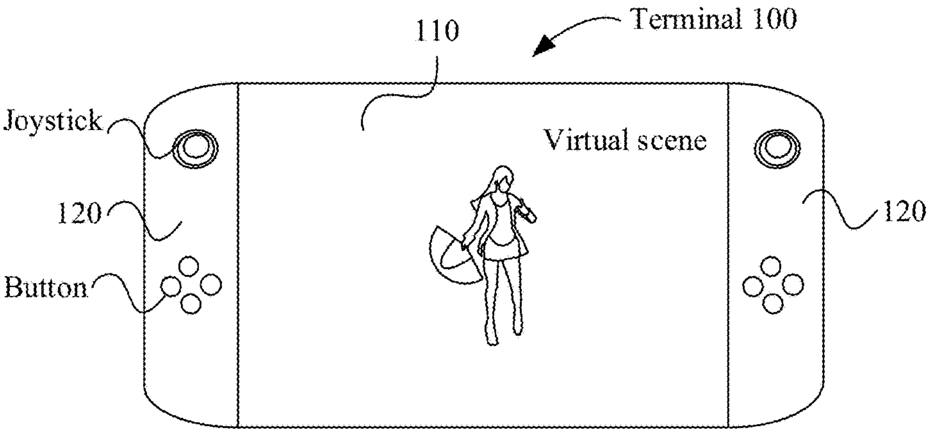
FIG. 2A to FIG. 2D are schematic diagrams of application modes of a method for controlling virtual skills in a virtual scene according to embodiments of the present disclosure.

FIG. 2A is a schematic diagram of an application mode of a method for controlling virtual skills in a virtual scene according to an embodiment of the present disclosure. In the mode, the virtual scene can be outputted completely based on a terminal, and the terminal 100 is composed of a display screen 110 and a joystick device 120, where the virtual scene runs on a display device 200, the display screen is configured to output the virtual scene, the joystick device 120 includes at least one joystick, at least one button and a device (e.g., a gamepad) of a processor for data processing, and the joystick device 120 is configured to control virtual objects and the virtual skills in the virtual scene displayed in the display screen. The virtual scene is an environment where the virtual objects interact, such as a plain, a street, and a valley for the virtual objects to fight. The virtual objects may be characters controlled by a user (or a player), that is, the virtual objects are controlled by the real user and are about to respond to push operation, by the real user, on the joystick device 120 to operate in the virtual scene.

For example, when the real user selects the button in the joystick device 120, a first virtual object (a virtual object corresponding to a current login account) and a skill identifier of a virtual skill of the first virtual object corresponding to the button are rendered in a virtual scene picture displayed in the display screen 110. When the player pushes the joystick in the joystick device 120 to control the skill identifier, the terminal 100 responds to the push operation and controls the skill identifier to move in a moving direction indicated by the push operation; and in the moving process of the skill identifier, when a second virtual object exists in a target area corresponding to the virtual skill, the skill identifier is controlled to cling to the second virtual object, so that the virtual skill, when being released, acts on the second virtual object.

Figure 2B:
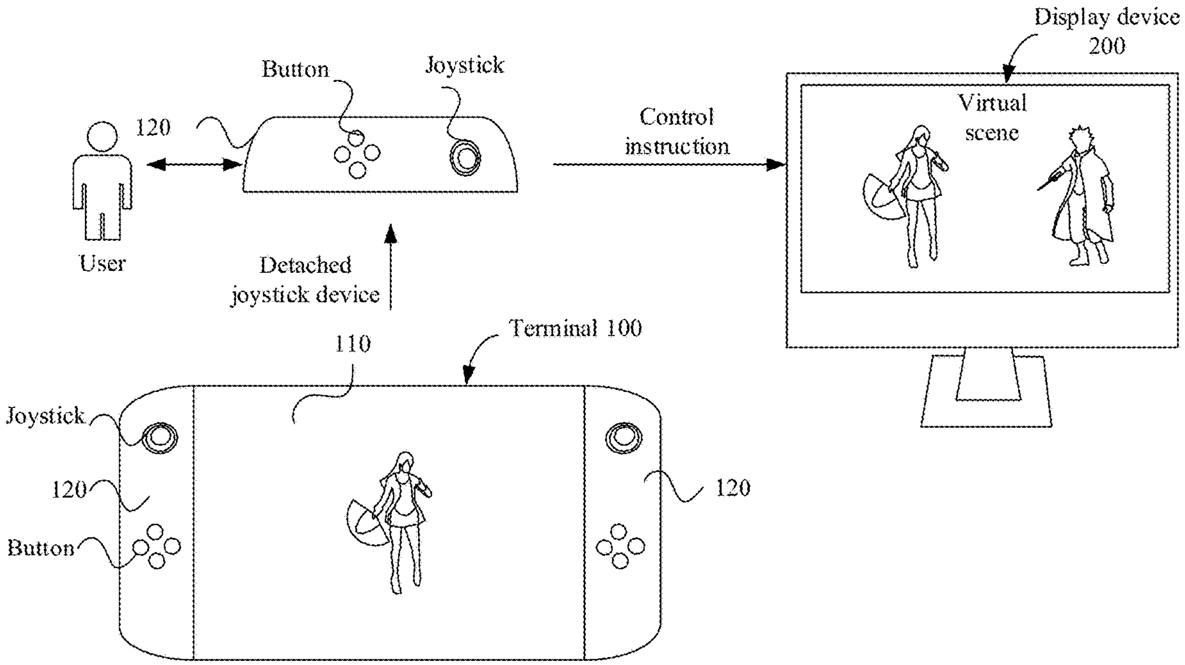

FIG. 2B is a schematic diagram of an application mode of a method for controlling virtual skills in a virtual scene according to an embodiment of the present disclosure. In the mode, the virtual scene can be collaboratively outputted based on a terminal 100 and a display device 200, where the terminal 100 is composed of a display screen 110 and a joystick device 120. The joystick device 120 includes at least one joystick, at least one button and a device (e.g., a gamepad) of a processor for data processing, the joystick device 120 can be detached from the terminal 100, the virtual scene is outputted by the detached joystick device 120 and the display device 200, where the joystick device 120 is configured to control virtual objects and the virtual skills in the virtual scene displayed in the display screen, the display device 200 is a device capable of displaying virtual scene pictures, including but not limited to: a television, a notebook computer, a tablet personal computer, a desk computer, etc., the terminal 100 is connected with the display device 200 through a network, the network may be a wide area network or a local area network, or a combination of both, and data transmission is implemented by a radio link or a wired link. In some embodiments, the joystick device 120 of the terminal 100 and the display screen are separated, after the joystick device generates control information, a control instruction is sent to the display device 200, the display device 200 outputs a corresponding virtual scene based on the control instruction, and the virtual scene is an environment where the virtual objects interact, such as a plain, a street, and a valley for the virtual objects to fight. The virtual objects may be characters controlled by a user (or a player), that is, the virtual objects are controlled by the real user and are about to respond to push operation, by the real user, on the joystick device 120 to operate in the virtual scene.

For example, when the real user selects the button in the joystick device 120, the joystick device 120 outputs a selection instruction for selecting a virtual skill, and after acquiring the selection instruction, the display device 200 renders a first virtual object and a skill identifier of the virtual skill of the first virtual object corresponding to the button in a virtual scene picture. When the real user pushes the joystick in the joystick device 120, the joystick device 120 outputs a moving instruction for controlling the skill identifier of the virtual skill of the virtual object to the display device 200, and after the display device 200 acquires the moving instruction, the skill identifier is controlled to move in a moving direction indicated by the movement control instruction; in the moving process of the skill identifier, when a second virtual object exists in a target area corresponding to the virtual skill, the skill identifier is controlled to cling to the second virtual object; and when the real user presses the joystick in the joystick device 120, the joystick device 120 outputs a control instruction for controlling the virtual object to release the virtual skill, and after the display device 200 acquires the control instruction, the first virtual object is controlled to release the virtual skill to act on the second virtual object.

Figure 2C:
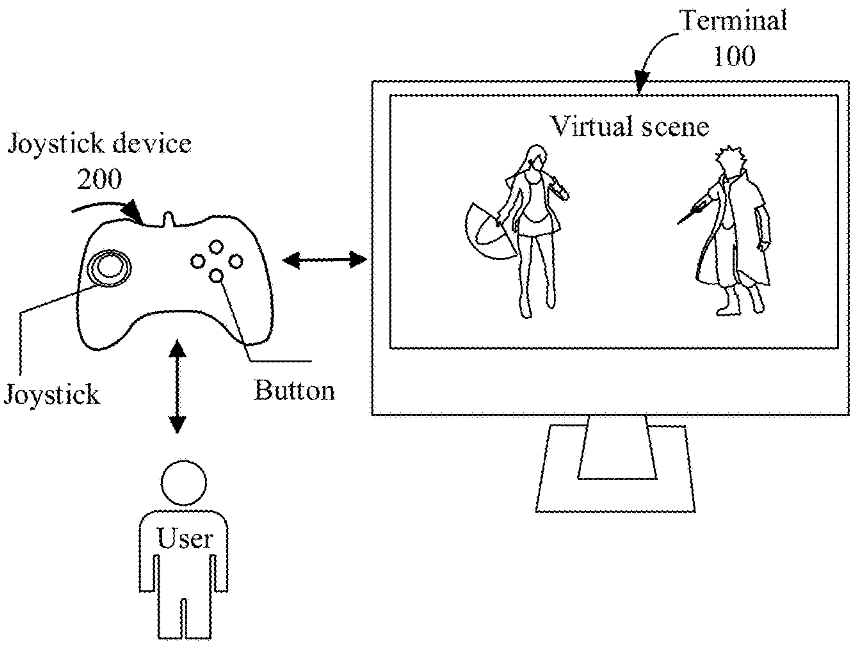

FIG. 2C is a schematic diagram of an application mode of a method for controlling virtual skills in a virtual scene according to an embodiment of the present disclosure. In the mode, the virtual scene can be collaboratively outputted based on a terminal 100 and a joystick device 200, and is applied to some application modes completely dependent on computing capability of the terminal 100 to complete virtual scene related data calculation, such as a standalone version or off-line mode game. The joystick device 200 includes at least one joystick, at least one button and a device (e.g., a gamepad) of a processor for data processing. The virtual scene is outputted by the terminal 100 such as a smart phone, a tablet personal computer and a virtual reality/augmented reality device, and the joystick device 200 controls the virtual objects and the virtual skills in the virtual scene outputted by the terminal 100. In some embodiments, the terminal 100 has the virtual scene (e.g., a standalone version game application) to run and outputs the virtual scene. The virtual scene is an environment where the virtual objects interact, such as a plain, a street, and a valley for the virtual objects to fight; and the virtual objects may be characters controlled by a user (or a player), that is, the virtual objects are controlled by the real user and are about to respond to push operation, by the real user, on the joystick device 200 to operate in the virtual scene.

For example, when the real user selects the button in the joystick device 200, the joystick device 200 outputs a selection instruction for selecting a virtual skill, and after acquiring the selection instruction, the terminal 100 renders a first virtual object and a skill identifier of the virtual skill of the first virtual object corresponding to the button in a virtual scene picture; when the real user pushes the joystick in the joystick device 200, the joystick device 200 outputs a movement control instruction for controlling the skill identifier of the virtual skill of the virtual object, and after receiving the movement control instruction, the terminal 100 controls the skill identifier to move in a moving direction indicated by the movement control instruction; in the moving process of the skill identifier, when a second virtual object exists in a target area corresponding to the virtual skill, the skill identifier is controlled to cling to the second virtual object; and when the real user presses the joystick in the joystick device 200, the joystick device 200 outputs a control instruction for controlling the virtual object to release the virtual skill, and after receiving the control instruction, the terminal 100 controls the first virtual object to release the virtual skill to act on the second virtual object.

Figure 2D:
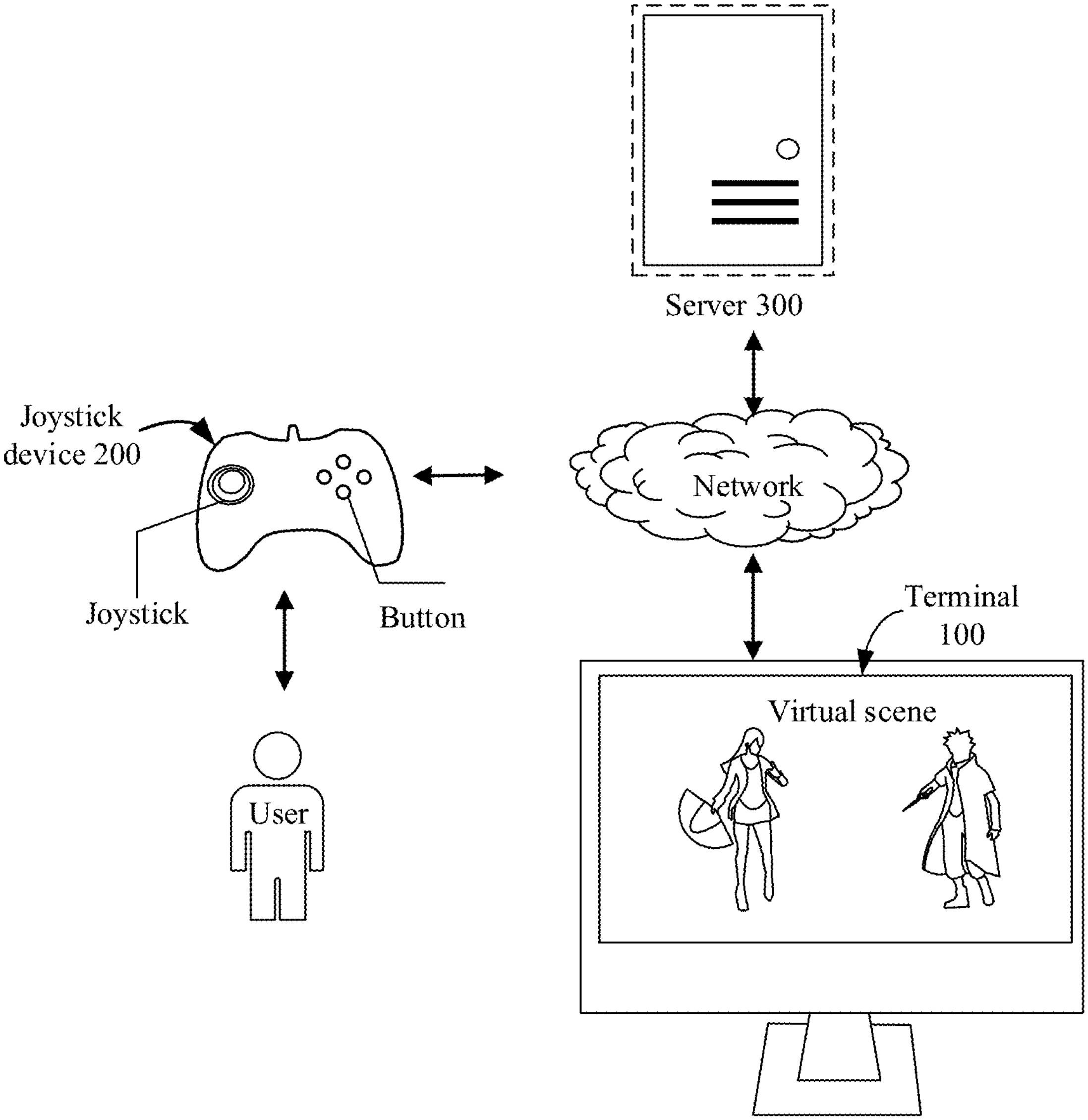

FIG. 2D is a schematic diagram of an application mode of a method for controlling virtual skills in a virtual scene according to an embodiment of the present disclosure. In the mode, the virtual scene can be collaboratively outputted based on a terminal 100, a joystick device 200 and a server 300, and is applied to application modes dependent on computing capability of the server 300 to complete virtual scene calculation and output the virtual scene in the terminal 100. In some embodiments, the joystick device 200 includes at least one joystick, at least one button and a device (e.g., a gamepad) of a processor for data processing. The virtual scene runs on the terminal 100, and the server 300 is a backend server corresponding to the virtual scene. A player controls virtual objects and the virtual skills in the virtual scene of the terminal 100 through the server connected by the joystick device 200. The terminal 100 outputs the virtual scene, the joystick device 200 controls the virtual objects and the virtual skills in the virtual scene outputted by the terminal 100, and the virtual scene is an environment where the virtual objects interact, such as a plain, a street, and a valley for the virtual objects to fight; and the virtual objects may be characters controlled by a user (or the player), that is, the virtual objects are controlled by the real user and are about to respond to push operation, by the real user, on the joystick device 200 to operate in the virtual scene.

For example, when the real user selects the button in the joystick device 200, the joystick device 200 outputs a selection instruction for selecting a virtual skill, and after receiving the selection instruction by the server 300, the terminal 100 renders a first virtual object and a skill identifier of the virtual skill of the first virtual object corresponding to the button in a virtual scene picture; when the real user pushes the joystick in the joystick device 200, the joystick device 200 outputs a movement control instruction for controlling the skill identifier of the virtual skill of the virtual object, and after receiving the movement control instruction by the server 300, the terminal 100 controls the skill identifier to move in a moving direction indicated by the movement control instruction; in the moving process of the skill identifier, when a second virtual object exists in a target area corresponding to the virtual skill, the skill identifier is controlled to cling to the second virtual object; and when the real user presses the first joystick in the joystick device 200, the joystick device 200 outputs a control instruction for controlling the virtual object to release the virtual skill, and after receiving the control instruction by the server 300, the terminal 100 controls the first virtual object to release the virtual skill to act on the second virtual object.

In some embodiments, an electronic device may implement a method for controlling virtual skills in a virtual scene according to the embodiment of the present disclosure by operating a computer program, for example, the computer program may be an original program or a software module in an operating system; the computer program may be native application (APP) and can run after being installed in the operating system, such as game APP; the computer program may also be a mini program and can run as long as being downloaded to a browser environment; and the computer program may also be a game mini program capable of being embedded into any APP. In a word, the computer program may be APP, modules or plugin in any form.

As an example, the server 300 may be an independent physical server, may also be a server cluster constituted by a plurality of physical servers, or a distributed system, and may also be a cloud server providing basic cloud computing services such as cloud services, cloud databases, cloud computing, cloud functions, cloud storage, network services, cloud communication, middleware services, domain name services, security services, content delivery network (CDN), big data and an artificial intelligence platform.

Figure 3:
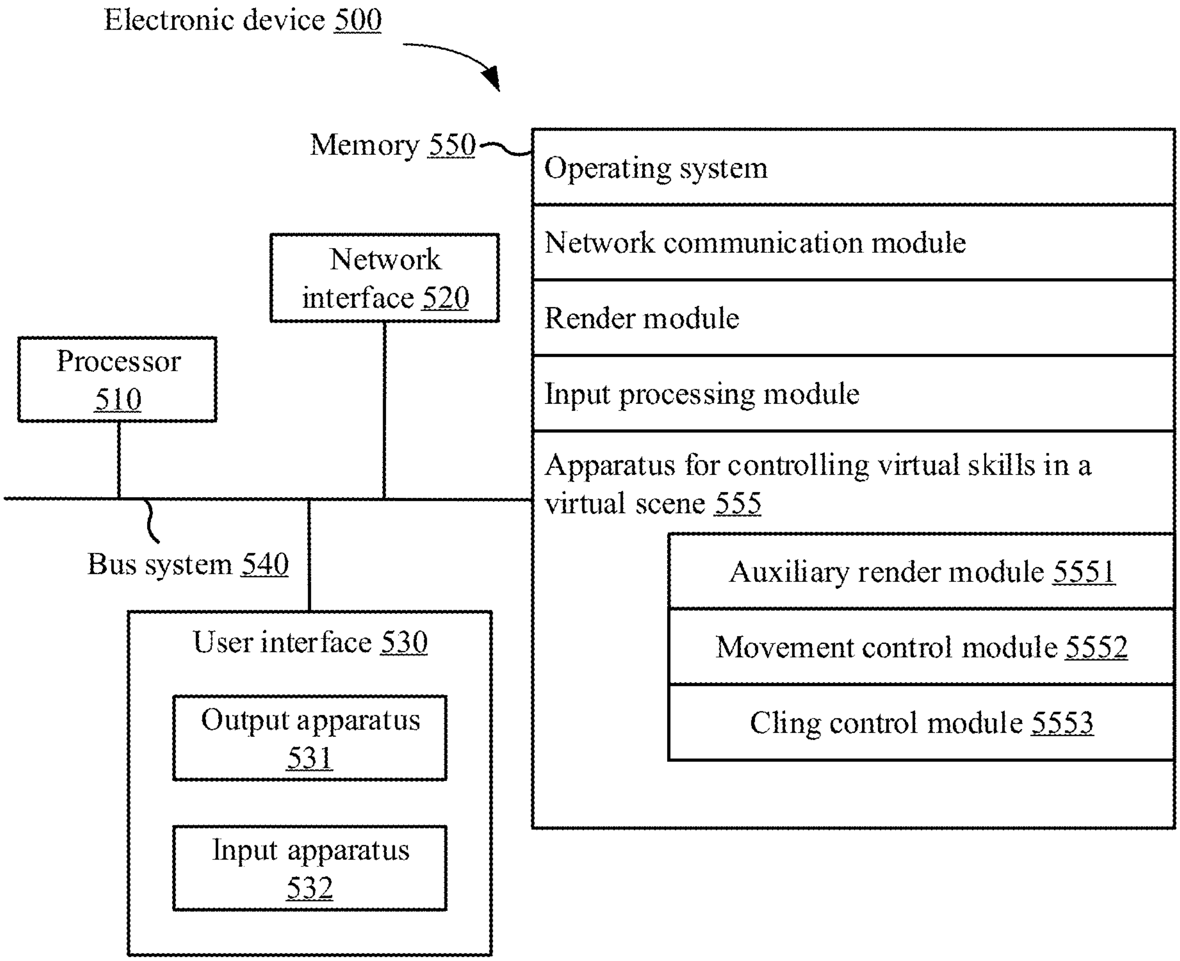
FIG. 3 is a schematic structural diagram of an electronic device according to an embodiment of the present disclosure.

FIG. 3 is a structural schematic diagram of an electronic device 500 according to an embodiment of the present disclosure. In some embodiments, taking the electronic device being the terminal 100 shown in FIG. 2A as an example, the electronic device for implementing the method for controlling virtual skills in a virtual scene according to the embodiment of the present disclosure is described. As shown in FIG. 3, the electronic device 500 includes: at least one processor 510, a memory 550, at least one network interface 520 and a user interface 530. Components in the electronic device 500 are coupled together by a bus system 540. It is to be understood that the bus system 540 is configured to implement connection and communication between the components. Besides a data bus, the bus system 540 further includes a power bus, a control bus, and a status signal bus. But, for sake of clear description, all types of buses in FIG. 3 are marked as the bus system 540.

The processor 510 may be an integrated circuit chip and has a signal processing capacity, such as a general purpose processor, a digital signal processor (DSP), or other programmable logic devices, a discrete gate or a transistor logic device, or a discrete hardware assembly, or the like, where the general purpose processor may be a microprocessor or any suitable processor, or the like.

The user interface 530 includes one or more output apparatuses 531 capable of rendering media content, including one or more speakers and/or one or more visual display screens. The user interface 530 further includes one or more input apparatuses 532, including a user interface component facilitating user input, such as a keyboard, a mouse, a microphone, a touch display screen, a camera, other input buttons and controls.

The memory 550 is removable, or not removable or a combination thereof. An exemplary hardware device includes a solid state memory, a hard disk driver, an optical driver, etc. The memory 550, in some embodiments, includes one or more memory devices far away from the processor 510 in physical position.

The memory 550 includes a volatile memory or a non-volatile memory, and may also include both the volatile memory and the non-volatile memory. The non-volatile memory may be a read only memory (ROM), and the volatile memory may be a random access memory (RAM). The memory 550 described in the embodiment of the present disclosure aims to include but not limited to any suitable type of memory.

In some embodiments, the memory 550 can store data so as to support various operations, and the data exemplarily includes programs, modules, and data structures or subsets or supersets thereof.

In some embodiments, an apparatus for controlling virtual skills in a virtual scene according to an embodiment of the present disclosure may be implemented in a software mode. FIG. 3 illustrates an apparatus 555 for controlling virtual skills in a virtual scene stored in the memory 550, which may be software in forms of a program and a plug-in, including following software modules: an auxiliary render module 5551, a movement control module 5552 and a cling control module 5553 which are logical, and thus can be combined or split as desired according to implemented functions, and functions of the various modules are described hereinafter.

Figure 4:
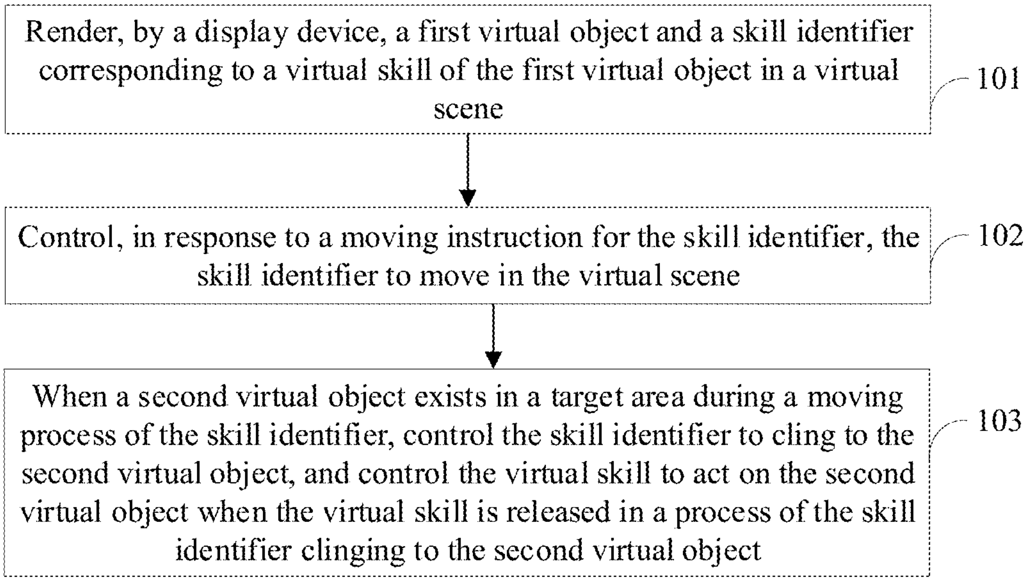
FIG. 4 is a schematic flowchart of a method for controlling virtual skills in a virtual scene according to an embodiment of the present disclosure.

As disclosed, the method for controlling virtual skills in a virtual scene according to the embodiment of the present disclosure may be implemented by the joystick device and the display device. FIG. 4 is a schematic flowchart of a method for controlling virtual skills in a virtual scene according to an embodiment of the present disclosure, and a description will be made in combination with steps shown in FIG. 4.

Step 101: Render, by a display device, a first virtual object and a skill identifier of a virtual skill of the first virtual object in the virtual scene.

Herein, in some embodiments, a client of the virtual scene is set in the display device, and an interface of the virtual scene is displayed by operating the client of the virtual scene, so that the first virtual object and the skill identifier of the virtual skill of the first virtual object are displayed in the interface of the virtual scene.

The display device may be, for example, the display screen 110 in FIG. 2A, the display device 200 in FIG. 2B, the terminal 100 in FIG. 2C, or the terminal 100 in FIG. 2D, or the like. In some embodiments, after the player generates a control signal through a joystick device, a control instruction is sent to the display device of the virtual scene, the display device responds to the control instruction to control the virtual object or the virtual skill in the virtual scene, such as controlling the virtual object to move in the virtual scene, to release the virtual skill, etc.

In some embodiments, the joystick device includes at least one joystick and at least one button. In virtual scene application, the joysticks and the buttons correspond to corresponding functions. For example, the joystick device includes a left joystick and a right joystick, where the left joystick is used for controlling a first virtual object of a current login account to move in the virtual scene, and the right joystick is used for controlling a virtual skill release position or release direction of the first virtual object; and the following buttons A, B, L, R, ZL and ZR respectively correspond to attack, cure, a skill 1, a skill 2, a skill 3 and talent respectively.

When the player selects the button in the joystick device, the joystick device outputs a selection instruction for selecting the virtual skill corresponding to the button to the display device, and after acquiring the selection instruction, the display device renders the first virtual object and the skill identifier of the virtual skill of the first virtual object corresponding to the button in an interface of the virtual scene, where the first virtual object is a virtual object in the virtual scene corresponding to the current login account, and the skill identifier is used for indicating the virtual skill release direction or release position. The player can control the first virtual object by the joystick device, such as controlling the first virtual object to move in the virtual scene, controlling the first virtual object to release the virtual skill, or controlling the first virtual object to interact with other virtual objects, or controlling the first virtual object to hold a virtual shooting prop (e.g., a virtual sniper rifle, a virtual submachine gun and a virtual shotgun) to shoot a second virtual object, or the like. The player can control a moving direction or a moving position of the skill identifier through the joystick device.

Step 102: Control, in response to a moving instruction for the skill identifier, the skill identifier to move in the virtual scene.

Herein, in some embodiments, the moving instruction is triggered by the joystick device, the user uses the joystick device to control the skill identifier in the virtual scene to move in the virtual scene, the skill identifier moves in the virtual scene in a direction indicated by the moving instruction, and the joystick device detects the operation of the player on the joystick device in real time. When the player pushes the joystick in the joystick device, the joystick device responds to the joystick pushing operation to output the moving instruction, for controlling the skill identifier of the virtual skill to move, to the display device, and after the display device receives the moving instruction, in response to the moving instruction, the skill identifier is controlled to move in the moving direction indicated by the moving instruction, where the moving direction indicated by the moving instruction is consistent with the joystick pushing direction.

In some embodiments, for different types of virtual skills, information indicated by moving instructions, for corresponding skill identifiers, triggered by pushing the joystick in the joystick device may be different. Taking a point-selecting type skill as an example, the joystick device determines, according to the joystick thrust and push direction, a movement speed and a moving direction of a skill identifier indicated by an outputted corresponding moving instruction; and taking a direction type skill as an example, the joystick device can determine, according to the joystick push direction only, a moving direction of a skill identifier indicated by an outputted corresponding moving instruction.

Step 103: In the moving process of the skill identifier, when a second virtual object exists in a target area, control the skill identifier to cling to the second virtual object, and when the virtual skill is released in the process of the skill identifier clinging to the second virtual object, control the virtual skill to act on the second virtual object.

In some embodiments, a target area corresponds to a virtual skill, and different virtual skills may correspond to different areas in a virtual scene. Herein, the target area is an area where a clinging function can be triggered, namely, a clinging area where the skill identifier corresponding to the virtual skill can be triggered to cling to the second virtual object. The target areas corresponding to the different kinds of virtual skills may be different in shape, for example, the target area corresponding to the point-selecting type skill may be circular; and the target area corresponding to the direction type skill may be fan-shaped or rectangular or the like.

When the second virtual object interacting with the first virtual object is in the target area, the skill identifier can be controlled to cling to the second virtual object, that is, the skill identifier is controlled to aim at the second virtual object, and later, whether one or more of the first virtual object, the joystick device and the second virtual object move, the skill identifier, within a certain range, will continuously cling to the second virtual object, and thus, accurate aiming at the second virtual object is implemented; and the virtual skill, when released, can act on the targeted second virtual object, and the aiming efficiency is improved.

In some embodiments, when there are a plurality of second virtual objects, a display device may control, through the following mode, a skill identifier to cling to the second virtual objects: distances between a location of the skill identifier and locations of the second virtual objects are acquired respectively; the second virtual object with a distance less than a target distance is selected, and the skill identifier is controlled to cling to the selected second virtual object; or, attribute values of the second virtual objects are respectively acquired; the second virtual object with the attribute value less than a target attribute value is selected, and the skill identifier is controlled to cling to the selected second virtual object.

Herein, when there are the plurality of second virtual objects, that is, a plurality of targets for cling thereto exist, the second virtual object closest to the skill identifier can be selected to cling thereto, or the second virtual object with the lowest attribute value such as a health point, an energy value, a hit point and a magic point.

In some embodiments, when there are a plurality of second virtual objects, a display device may further control, through the following mode, a skill identifier to cling to the second virtual objects: distances between a location of the skill identifier and locations of the second virtual objects are acquired respectively; and when there are still a plurality of second virtual objects with a distance less than a target distance, the attribute value of the second virtual objects with the distance less than the target distance is respectively selected, the second virtual object with the attribute value less than a target attribute value is selected, and the skill identifier is controlled to cling to the selected second virtual object.

Herein, in some embodiments, if there are a plurality of second virtual objects in the virtual scene, the second virtual object spaced from the skill identifier by the distance less than the target distance can be selected as the target to finally cling to by the skill identifier; when there are still a plurality of second virtual objects with the distance less than the target distance, from which a target can be screened, for example, the attribute value of the second virtual objects with the distance less than the target distance is acquired, and the second virtual object with the attribute value less than the target attribute value is selected as a final clinging target of the skill identifier; of course, in some embodiments, when there are still a plurality of second virtual objects lower than the target attribute value, the plurality of second virtual objects lower than the target attribute value may be screened, for example, one of the second virtual objects is selected, e.g., randomly selected, as the final clinging target of the skill identifier; and thus, when there are the plurality of second virtual objects, that is, a plurality of targets capable of being clung exist, the second virtual object closest to the skill identifier is preferably considered to be a final clinging object, and when there are still a plurality of second virtual objects closest to the skill identifier, the second virtual object with the lowest attribute value is reselected as the final clinging target.

It is to be understood that, in some embodiments, any one or more of the second virtual objects can be selected from the plurality of second virtual objects as the clinging targets, for example, preliminary screening can be performed based on the attribute value of the second virtual objects, and screening is then performed in combination with the distance between the skill identifier and the second virtual objects. The present disclosure does not limit a selection mode for the second virtual objects for clinging.

In some embodiments, before a display device controls a skill identifier to cling to a second virtual object, the following mode can be adopted to determine that the second virtual object exists in a target area corresponding to a virtual skill: a circumference area with a location of the skill identifier as a circle center and a target distance as a radius is acquired and determined as the target area corresponding to the virtual skill; and a distance between the location of the skill identifier and a location of the second virtual object is acquired, and when the distance does not exceed the radius of the circumference area, it is determined that the second virtual object exists in the target area corresponding to the virtual skill.

In some embodiments, when the virtual skill is the point-selecting type skill, the location of the skill identifier is a center position of the skill identifier, and thus the circumference area with the location of the skill identifier as the circle center and the target distance as the radius serves as the clinging area (e.g., the target area) where the clinging function is triggered, where the target distance is a distance between the location of the skill identifier capable of triggering the clinging function and the location of the second virtual object, and is also called a clinging distance. The target distance=the radius of the skill identifier+a, where a is a configurable constant, and when the distance between the location of the second virtual object and the location of the skill identifier does not exceed the radius of the clinging area (e.g., the clinging distance), it can be determined that the second virtual object exists in the clinging area, the clinging function is triggered at the time, so that the skill identifier is controlled to cling to the second virtual object so as to aim at the second virtual object.

In some embodiments, after a display device controls a skill identifier to cling to a second virtual object, a first virtual object can be controlled, in response to a displacement instruction for the first virtual object, to move in a virtual scene; and in the moving process of the first virtual object, a distance between the first virtual object and the second virtual object is acquired, and when the distance does not exceed a distance threshold, the skill identifier is controlled to continuously cling to the second virtual object.

Herein, in some embodiments, the displacement instruction may be triggered by the joystick device, and may also be triggered by touch operation on a screen of the display device; and when the player pushes the joystick (e.g., the left joystick), in the joystick device, for controlling the movement of the first virtual object, the joystick device outputs the displacement instruction for the first virtual object to the display device, and after the display device receives the displacement instruction, the first virtual object is controlled, in response to the displacement instruction, to move in the virtual scene in a moving direction indicated by the displacement instruction.

In some embodiments, when the joystick, in the joystick device, for controlling the movement of the skill identifier does not control the movement of the skill identifier, along with the movement of the first virtual object in the virtual scene, the skill identifier synchronously moves in the virtual scene, so as to guarantee that the skill identifier is constantly located at a relative position of the first virtual object; accordingly, when the distance between the second virtual object and the skill identifier does not exceed the radius of the clinging area, the clinging function is triggered; and because the relative position of the first virtual object relative to the skill identifier is fixed, it can be considered that when the distance between the first virtual object and the second virtual object exceeds the distance threshold (different from the clinging distance), the clinging function is not triggered, and when the distance between the first virtual object and the second virtual object does not exceed the distance threshold (different from the clinging distance), the clinging function is triggered. The distance threshold is a distance between the first virtual object and the second virtual object, exceeding which the clinging function can be triggered, and thus, in the moving process of the first virtual object, the distance between the first virtual object and the second virtual object is acquired in real time, and when the distance does not exceed the distance threshold, the skill identifier is controlled to continuously cling to the second virtual object.

In addition, in some embodiments, when the first virtual object moves away from the second virtual object, the joystick device can also acquire a theoretical real-time position of the skill identifier along with movement of the first virtual object in real time, and acquire a distance between the theoretical real-time position of the skill identifier and the second virtual object, and when the distance therebetween is less than the radius of the clinging area (e.g., the clinging distance), the joystick device outputs a continuous clinging instruction for the second virtual object to the display device, the display device controls, in response to the continuous clinging instruction, the skill identifier to continuously cling to the second virtual object, that is, visually, the skill identifier does not move along with joystick pushing. When the distance therebetween exceeds a separation distance in which the clinging function fails, the joystick device outputs a separation instruction for the second virtual object to the display device, the display device controls the skill identifier to separate from the second virtual object and controls the skill identifier to present at the theoretical real-time position, that is, visually, the skill identifier is separated from the second virtual object, and the skill identifier is rendered at the identifier moving theoretical real-time position.

In some embodiments, before a display device controls a skill identifier to cling to a second virtual object, the following mode can be adopted to determine that the second virtual object exists in a target area corresponding to a virtual skill: a fan-shaped area with a location of a first virtual object as a circle center, a target distance as a radius and a target angle as a central angle is acquired, and determined as a target area corresponding to the virtual skill; a first connecting line between the location of the first virtual object and the location of the skill identifier, and a second connecting line between the location of the first virtual object and the location of the second virtual object are acquired; and an included angle between the first connecting line and the second connecting line is acquired, and when the included angle does not exceed an included angle threshold and a length of the second connecting line does not exceed a length threshold, it is determined that the second virtual object exists in the target area corresponding to the virtual skill.

Herein, when the virtual skill is the direction type skill, the target area consistent with the skill identifier in shape serves as the clinging area where the clinging function is triggered. Since the direction indicated by the skill identifier relative to the first virtual object is the virtual skill release direction, the first connecting line is a center line of the skill identifier, and the included angle threshold is a half of the central angle and is also called a clinging angle by which the clinging function can be triggered. When the included angle between the first connecting line and the second connecting line does not exceed the clinging angle and the length of the second connecting line does not exceed the radius of the fan-shaped area, it is considered that the second virtual object is located in the clinging area where the clinging function can be triggered.

In some embodiments, a display device may adopt the following mode, in response to a moving instruction triggered based on a joystick device for a skill identifier, controls the skill identifier to move in a moving direction indicated by the moving instruction: in response to the moving instruction for the skill identifier, the moving instruction may be triggered by the joystick device or touch operation in a display screen of the display device, the skill identifier is controlled to move, by a target angular speed, in a moving direction indicated by the moving instruction;

correspondingly, after the display device controls the skill identifier to cling to a second virtual object, the following mode can be adopted to adjust a rotation angular speed of the skill identifier: an angular speed adjustment instruction triggered based on the joystick device for the skill identifier is received, where the angular speed adjustment instruction is triggered by pushing the joystick device in an orientation indicated by the skill identifier; and in response to the angular speed adjustment instruction, when a joystick of the joystick device is inconsistent with the skill identifier in orientation, a rotation target angular speed of the skill identifier is adjusted so as to control the skill identifier to rotate according to the adjusted target angular speed until the joystick is consistent with the skill identifier in orientation.

Herein, when the player pushes the joystick (e.g., the right joystick), in the joystick device, for controlling the movement of the skill identifier to keep away from the second virtual object, the joystick device records a movement theoretical real-time position, without the clinging target, of the skill identifier along with joystick pushing in real time, where the theoretical real-time position of the skill identifier is decided by the movement speed of the skill identifier (decided by a thrust of joystick pushing) and a push duration of joystick pushing; an included angle between a connecting line between the theoretical real-time position of the skill identifier and the first virtual object and a connecting line between the first virtual object and the second virtual object is acquired, when the included angle therebetween is less than the clinging angle, the joystick device outputs, in response to the push operation, the continuous clinging instruction for the second virtual object to the display device, and the display device controls, in response to the continuous clinging instruction, the skill identifier to continuously cling to the second virtual object, that is, visually, the skill identifier does not move along with joystick pushing; and when the included angle therebetween exceeds the clinging angle, the joystick device outputs, in response to the push operation, the separation instruction for the second virtual object to the display device, the display device controls the skill identifier to separate from the second virtual object and controls the skill identifier to present at the theoretical real-time position, that is, visually, the skill identifier is separated from the second virtual object, and the skill identifier is rendered at the identifier moving theoretical real-time position.

In some embodiments, when the orientation of the skill identifier and the joystick orientation are inconsistent, if the player continues to push the joystick and the joystick is pushed to approach the skill identifier, the joystick device outputs, in response to the push operation, the angular speed adjustment instruction for the skill identifier to the display device, and the display device reduces, in response to the angular speed adjustment instruction, the target angular speed of the skill identifier so as to compensate for a difference between the joystick orientation and an indicator orientation, so that the joystick orientation is consistent with the orientation of the skill identifier as soon as possible; and when the joystick is pushed to keep away from the skill identifier, the joystick device outputs, in response to the push operation, the angular speed adjustment instruction for the skill identifier to the display device, and the display device increases, in response to the angular speed adjustment instruction, the target angular speed of the skill identifier so as to compensate for the difference between the joystick orientation and the indicator orientation, so that the joystick orientation is consistent with the orientation of the skill identifier as soon as possible.

In some embodiments, after a display device controls a skill identifier to cling to a second virtual object, the following mode can be adopted to control the skill identifier to continuously cling to the second virtual object: in response to a displacement instruction, triggered based on a joystick device, for a first virtual object, the first virtual object is controlled to move in a virtual scene; a target area corresponding to the virtual skill is updated along with the movement of the first virtual object; and when the second virtual object still exists in the updated target area, the skill identifier is controlled to continuously cling to the second virtual object.

Herein, in some embodiments, when the user controls the first virtual object to move in the virtual scene, the target area where the clinging function corresponding to the virtual skill of the first virtual object is triggered synchronously moves and is updated, and when the second virtual object still exists in the updated target area, the skill identifier is controlled to continuously cling to the second virtual object, that is, visually, the skill identifier does not move along with the movement of the first virtual object; and when the second virtual object does not exist in the updated target area, it represents that the first virtual object deviates from the second virtual object, the skill identifier is controlled to separate from the second virtual object at the time, that is, the skill identifier is visually separated from the second virtual object, the skill identifier is controlled to be immediately rendered at a default position in the virtual scene, and the default position may be a position having a fixed relative position relationship with the first virtual object, or may be a fixed position in the virtual scene.

In some embodiments, when a second virtual object does not exist in an updated target area and a third virtual object different from the second virtual object exists, a skill identifier is controlled, through switchover, to cling to the third virtual object from the second virtual object.

Herein, in some embodiments, the target area is updated along with the movement of the first virtual object, and when the updated target area keeps away from the second virtual object but approaches the third virtual object, the second virtual object does not exist in the updated target area, and the third virtual object exists in the updated target area, the clinging target is changed, that is, the skill identifier is controlled, through switchover, to cling to the third virtual object from the second virtual object.

In some embodiments, after a display device controls a skill identifier to cling to a second virtual object, the following mode can be adopted to control the skill identifier to continuously cling to the second virtual object: a picture that the second virtual object moves in a virtual scene is displayed; in the displaying process of the picture, when the second virtual object exists in a target area corresponding to a virtual skill, the skill identifier is controlled to cling to the second virtual object; and when the second virtual object moves out of the target area corresponding to the virtual skill, the skill identifier is controlled to separate from the second virtual object.

Herein, after the skill identifier clings to the second virtual object, if the second virtual object moves in the virtual scene, whether the second virtual object moves out of the target area where the clinging function can be triggered is judged in real time, and when the second virtual object does not move out of the target area, the skill identifier is controlled to continuously cling to the second virtual object, that is, visually, the skill identifier synchronously moves along with the second virtual object, and the moving skill identifier deviates from the relative position relative to the first virtual object; and when the second virtual object moves out of the target area, the skill identifier is controlled to separate from the second virtual object, that is, visually, the skill identifier is separated from the second virtual object, and the skill identifier is controlled to be immediately rendered at the relative position relative to the first virtual object.

In some embodiments, after a display device controls a skill identifier to cling to a second virtual object, the following mode can be adopted to control the skill identifier to continuously cling to the second virtual object: a picture that the second virtual object moves in a virtual scene is displayed; in the displaying process of the picture, the skill identifier is controlled to move along with the second virtual object; in the moving process of the skill identifier along with the second virtual object, a distance between a first virtual object and the second virtual object is acquired; and when the distance exceeds a distance threshold, the skill identifier is controlled to separate from the second virtual object.

Under normal conditions, when the virtual skill is the point-selecting type skill and the joystick, in the joystick device, for controlling the movement of the skill identifier does not control the movement of the skill identifier, along with the movement of the first virtual object in the virtual scene, the skill identifier synchronously moves in the virtual scene, so as to guarantee that the skill identifier is constantly located at a relative position of the first virtual object; when the distance between the second virtual object and the skill identifier does not exceed the radius of a clinging area, the clinging function is triggered; and because the relative position of the first virtual object relative to the skill identifier is fixed, it can be considered that when the distance between the first virtual object and the second virtual object exceeds the distance threshold, the clinging function is not triggered, and when the distance between the first virtual object and the second virtual object does not exceed the distance threshold, the clinging function is triggered, and the skill identifier is controlled to cling to the second virtual object.

After the skill identifier clings to the second virtual object, if the second virtual object moves in the virtual scene, the distance between the first virtual object and the second virtual object is acquired in real time, when the distance therebetween does not exceed the distance threshold, the skill identifier is controlled to continuously cling to the second virtual object, that is, visually, the skill identifier synchronously moves along with the second virtual object, and the moving skill identifier deviates from the relative position relative to the first virtual object; and when the distance therebetween exceeds the distance threshold, the skill identifier is controlled to separate from the second virtual object, that is, visually, the skill identifier is separated from the second virtual object, and the skill identifier is controlled to be immediately rendered at the relative position relative to the first virtual object.

In addition, in some embodiments, in the moving process of the second virtual object, a distance between an actual position of the skill identifier and the location of the second virtual object can be acquired in real time when the skill identifier does not cling to the second virtual object. When the distance therebetween is less than the radius of the clinging area (e.g., the clinging distance), the joystick device outputs a continuous clinging instruction for the second virtual object to the display device, the display device controls, in response to the continuous clinging instruction, the skill identifier to continuously cling to the second virtual object, that is, visually, the skill identifier synchronously moves along with the second virtual object; and when the distance therebetween exceeds a separation distance in which the clinging function fails, the joystick device outputs a separation instruction for the second virtual object to the display device, the display device controls the skill identifier to separate from the second virtual object and controls the skill identifier to present at the relative position relative to the first virtual object, that is, visually, the skill identifier is separated from the second virtual object, and the skill identifier is rendered at the relative position relative to the first virtual object.

When the virtual skill is the direction type skill, after the skill identifier clings to the second virtual object, if the second virtual object moves in the virtual scene, an included angle between a first connecting line between the skill identifier and the first virtual object and a second connecting line between the first virtual object and the second virtual object can be acquired in real time when the skill identifier does not cling to the second virtual object. Herein, the first connecting line may be a connecting line between a theoretical actual position of the skill identifier and the position of the first virtual object.

When the included angle between the first connecting line and the second connecting line is less than the clinging angle, the joystick device outputs a continuous clinging instruction for the second virtual object to the display device, the display device controls, in response to the continuous clinging instruction, the skill identifier to continuously cling to the second virtual object, that is, visually, the skill identifier synchronously moves along with the second virtual object; and when the included angle therebetween exceeds the clinging angle, the joystick device outputs a separation instruction for the second virtual object to the display device, the display device controls the skill identifier to separate from the second virtual object and controls the skill identifier to present at the relative position relative to the first virtual object, that is, visually, the skill identifier is separated from the second virtual object, and the skill identifier is rendered at the relative position relative to the first virtual object.

In some embodiments, after a display device controls a skill identifier to cling to a second virtual object, the following mode can be adopted to control the skill identifier to continuously cling to the second virtual object: a picture that the second virtual object moves in a virtual scene is displayed; in the displaying process of the picture, instruction information for indicating a moving path of the second virtual object is rendered; and based on the instruction information, the skill identifier is controlled, in response to a moving instruction triggered based on a joystick device for the skill identifier, to move according to the moving path indicated by the instruction information, so that the skill identifier continuously clings to the second virtual object.

Herein, in the moving process of the second virtual object in the virtual scene, the instruction information of the moving path of the second virtual object is rendered in real time, the player can push a joystick, for controlling the skill identifier to move, in the joystick device according to the moving path of the second virtual object indicated by the instruction information. The joystick device outputs, in response to the push operation, a moving instruction for the skill identifier to the display device, and the display device controls, in response to the moving instruction, the skill identifier to move according to the moving path indicated by the instruction information, so that the skill identifier continuously clings to the second virtual object. In some embodiments, the player may also push a joystick, for controlling the first virtual object to move, in the joystick device, the joystick device outputs, in response to the push operation, a displacement instruction for the first virtual object to the display device, the display device controls, in response to the displacement instruction, the first virtual object to move according to the moving path indicated by the instruction information, and correspondingly, the skill identifier follows the first virtual object to move according to the moving path indicated by the instruction information, so that the skill identifier continuously clings to the second virtual object.

In some embodiments, after a display device controls a skill identifier to cling to a second virtual object, the following mode can be adopted to control a virtual skill to be released to act on the second virtual object: in response to a release instruction, triggered based on a joystick device, for the virtual skill, a first virtual object is controlled to release the virtual skill at a moving target position or in a moving direction, so that the released virtual skill acts on the second virtual object.

Herein, when the player presses a joystick, for controlling the virtual skill to be released, in a joystick device, the joystick device outputs the release instruction for the virtual skill to the display device; and after acquiring the release instruction, the display device controls the first virtual object to release the virtual skill at the target position where the skill identifier moves, or controls the first virtual object to release the virtual skill in the moving direction indicated by the skill identifier, so that the released virtual skill is controlled to act on the second virtual object.

The joystick device is operated to control the skill identifier to move to a release direction or a release position where the user expects to release the virtual skill. In addition, whether the first virtual object or the second virtual object moves in the virtual scene, the skill identifier can be controlled, within the target area where automatic clinging can be triggered, to cling to the second virtual object in the release direction or release position when the thrust or a pushing angle of the joystick in the joystick device pushed by the player is not enough for the skill identifier to separate from the target, thereby implementing accurate aiming at the second virtual object, improving aiming precision specific to the target, the human-computer interaction efficiency and the hardware resource utilization rate, and meanwhile bringing experience with more sense of control to the user.

An exemplary application of the embodiment of the present disclosure in a practical application scene is described below. The method for controlling virtual skills in a virtual scene according to the embodiment of the present disclosure is described by taking an example that in a virtual scene in the MOBA played on a game console (e.g., a handheld game console) and the virtual skills are the point-selecting type skill and the direction type skill according to types.

First, an architecture of the game console (e.g., the handheld game console) is described. The terminal 100 in FIG. 2A is the game console, and the game console includes the display screen and the joystick device, where the display screen is configured to output a running game picture, the joystick device (or a gamepad) includes at least one joystick and at least one button and is configured to control game characters (virtual objects) and virtual skills in the game picture displayed in the display screen.

Figure 5:
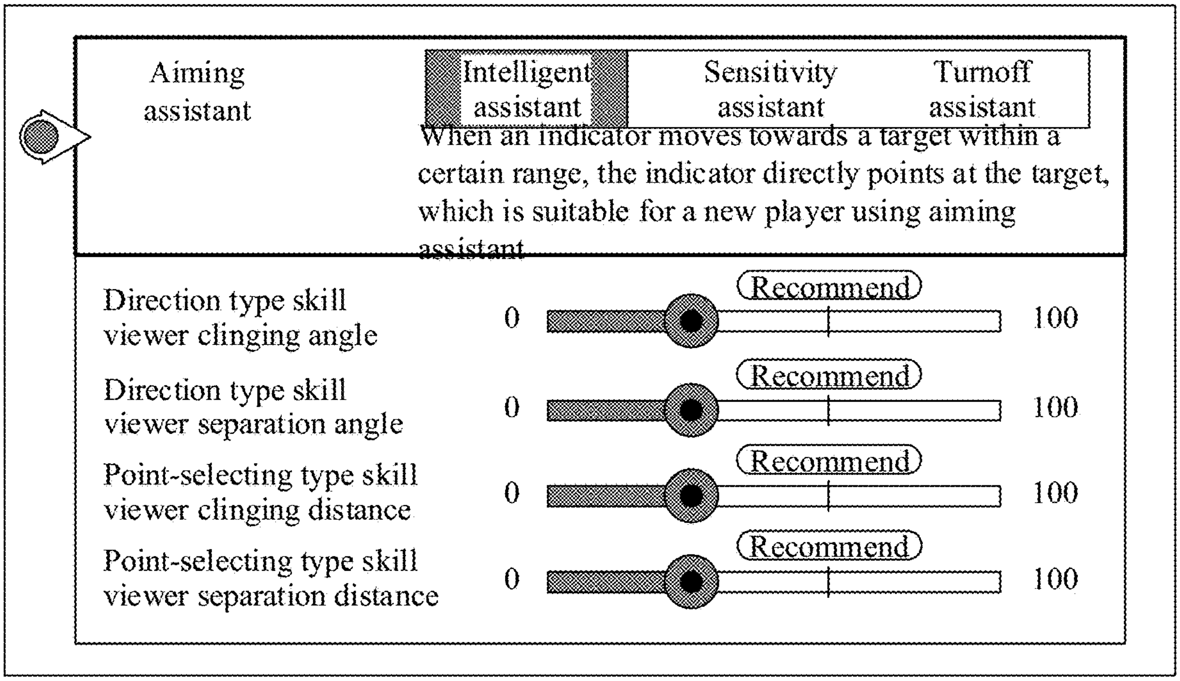
FIG. 5 is a schematic diagram of an aiming assistant mode setting interface according to an embodiment of the present disclosure.

Before using the virtual skill, an assistant mode specific to the virtual skill can be set on the game console so that under assistance of the set assistant mode, efficiency of aiming at a target can be improved when the virtual object is released. FIG. 5 is a schematic diagram of an aiming assistant mode setting interface according to an embodiment of the present disclosure. A plurality of optional aiming assistant modes are rendered in the assistant mode setting interface corresponding to the virtual skill of the first virtual object, such as an intelligent assistant mode and a sensitivity assistant mode, where the intelligent assistant is the assistant mode corresponding to the method for controlling virtual skills in a virtual scene according to the embodiment of the present disclosure, and in the assistant mode, for the virtual skill of the first virtual object, when an indicator (e.g., the skill identifier) corresponding to the virtual skill moves to be away from the target (e.g., the second virtual object) within a certain range, the automatic clinging aiming function is triggered, that is, the indicator is controlled to directly clings to the target, thereby realizing accurate aiming at the target.

Before the assistant mode is used, trigger conditions for triggering automatic clinging aiming can be first set. For example, for the point-selecting type skill, a clinging distance by which the indicator is triggered to clings to the target, and a separation distance by which the indicator is triggered to separate from the target can be set, and for the direction type skill, a clinging angle by which the indicator is triggered to clings to the target and a separation angle by which the indicator is triggered to separate from the target can be set. The point-selecting type skill and the direction type skill are respectively described below.

1. Point-Selecting Type Skill

Figure 6:
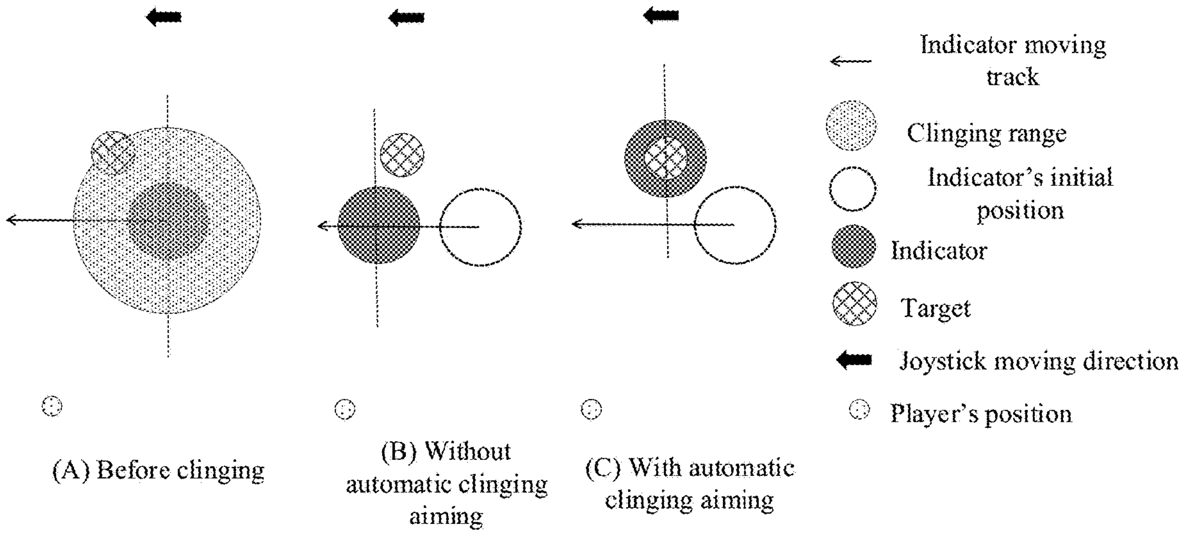
FIG. 6 is a principle schematic diagram that an indicator clings to a target according to an embodiment of the present disclosure.

FIG. 6 is a principle schematic diagram that an indicator clings to a target according to an embodiment of the present disclosure. Assuming that the player pushes a joystick leftwards all the time (FIG. A), the indicator will move, without an automatic clinging aiming function, in a joystick pushing direction all the time (FIG. B), and if there is the automatic clinging aiming function, and the target is within a clinging range (e.g., a distance between a center of a skill identifier and a center of the target is less than a clinging distance), the indicator will deviate from an original movement track to cling to the target, that is, a center point of the indicator immediately coincides with a center point of the target (FIG. C).

Figure 7:
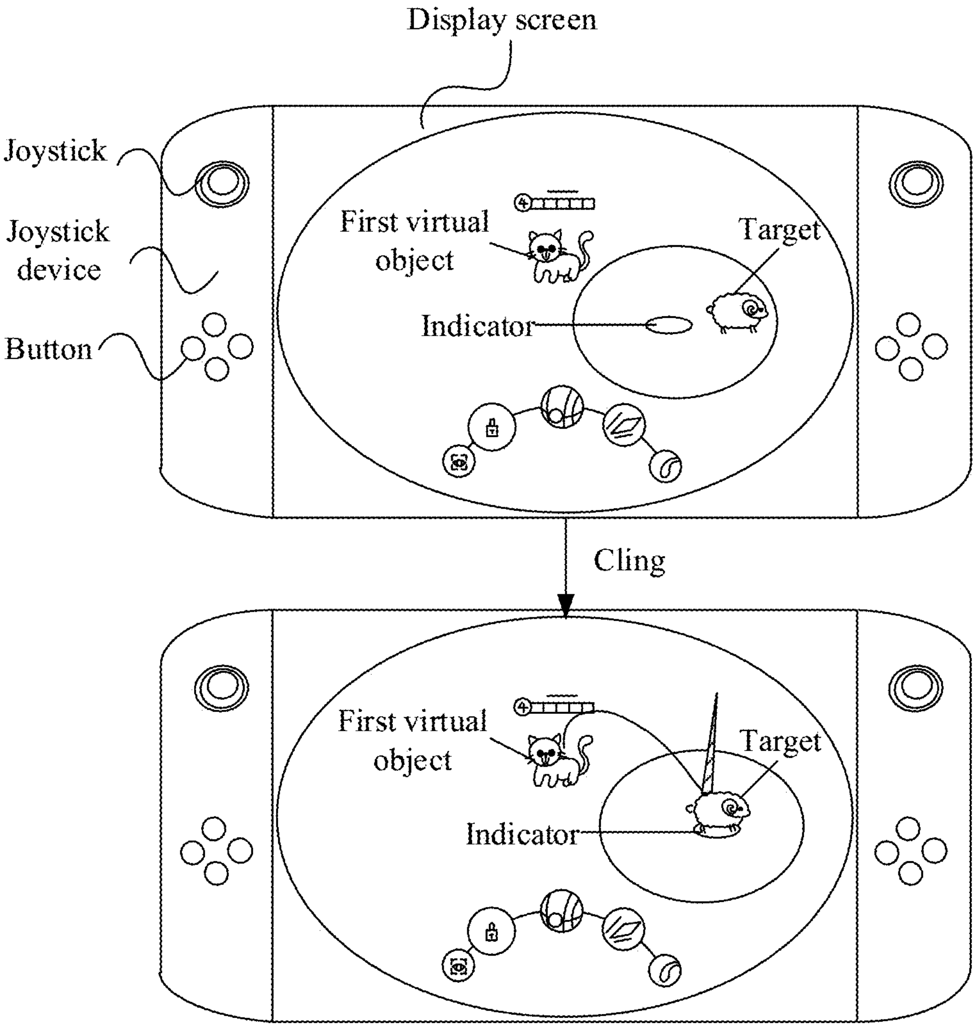
FIG. 7 is a display interface schematic diagram that an indicator clings to a target according to an embodiment of the present disclosure.

FIG. 7 is a display interface schematic diagram that an indicator clings to a target according to an embodiment of the present disclosure. When the player presses, by a joystick device on a game console, a button corresponding to the point-selecting type skill, the game console renders, in response to the press operation on the button, a first virtual object and the indicator of the point-selecting type skill in a display screen, and when the player controls, by the joystick device, the indicator to move, if the target (e.g., the second virtual object) is located within a clinging area, the indicator is controlled to cling to the target, and in the process that the indicator clings to the target, even when at least one of the player, the target and a joystick moves, the indicator is controlled to continuously cling to the target as long as the target is still in the clinging area; and when the target is not within the clinging range, the indicator is controlled not to cling to the target, and controlled to present at a relative position relative to the player.

Figure 8:
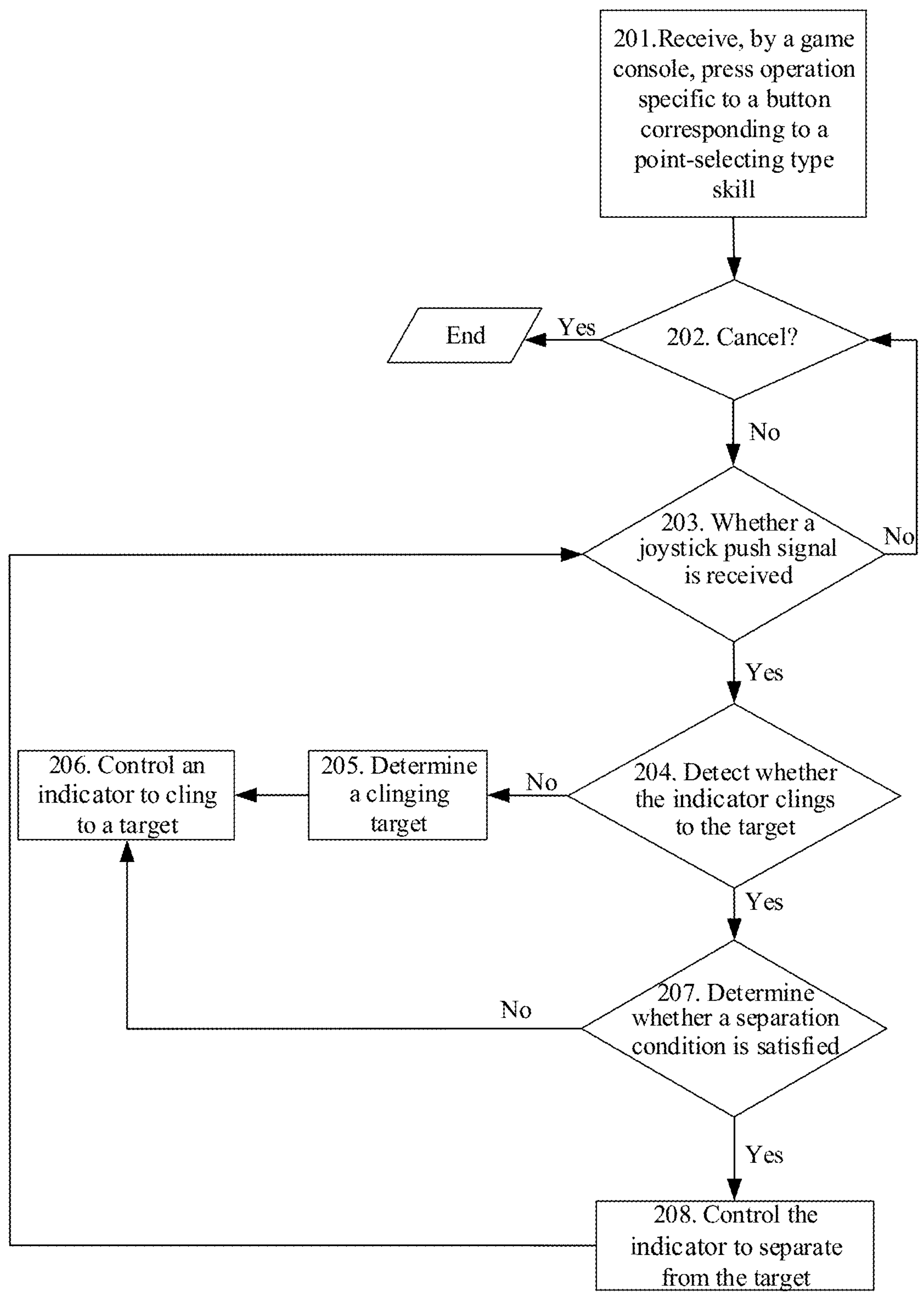
FIG. 8 is a schematic flowchart of a method for controlling virtual skills in a virtual scene according to an embodiment of the present disclosure.

FIG. 8 is a schematic flowchart of a method for controlling virtual skills in a virtual scene according to an embodiment of the present disclosure, and a process of applying the method to the point-selecting type skill is described in combination with FIG. 8 below.

Step 201: Receive, by a game console, press operation specific to a button corresponding to the point-selecting type skill.

Herein, when the player presses the button, corresponding to the point-selecting type skill, in a joystick device, the game console determines, in response to the press operation, the point-selecting type skill selected by the player, and renders an indicator corresponding to the point-selecting type skill in a display screen.

Step 202: Detect whether the point-selecting type skill is canceled or not.

Herein, in some embodiments, whether the point-selecting type skill is canceled or not can be judged by detecting whether the player triggers a button, for canceling the point-selecting type skill, in the joystick device or not, and when the point-selecting type skill is canceled, the process is ended; and when the point-selecting type skill is not canceled, step 203 is performed.

Step 203: Detect whether a joystick push signal is received or not.

Herein, in some embodiments, whether the joystick push signal is received or not can be judged by detecting whether the player pushes and presses the joystick in the joystick device or not, and when the joystick push signal is received, step 204 is performed; and if not, step 202 is performed.

Step 204: Detect whether the indicator clings to the target or not.

Herein, when the indicator does not cling to the target, step 205 is performed; and if not, step 206 is performed.

Step 205: Determine a target for clinging.

Figure 9:
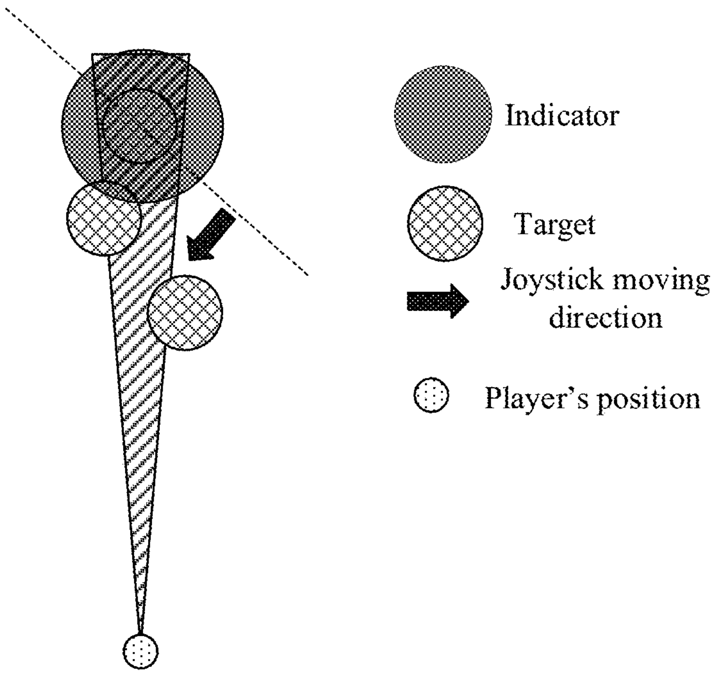
FIG. 9 is a schematic diagram of determining a clinging target according to an embodiment of the present disclosure.

FIG. 9 is a schematic diagram of determining a target for clinging according to an embodiment of the present disclosure. In some embodiments, the player searches for a target on the side in a joystick pushing direction, when there are a plurality of candidate targets on the side, distances between an indicator and the candidate targets can be respectively acquired, the candidate target with the distance less than a clinging distance is selected as the target for clinging, and when there are a plurality of target for clingings, the target with the lowest attribute value, such as a health point, an energy value, a hit point and a magic point can be selected as the final target for clinging.

Step 206: Control the indicator to cling to the target.

Step 207: Judge whether a separation condition is satisfied or not.

Herein, when a movement distance by which the player operates the joystick to move is less than the separation distance, it is considered that the indicator does not satisfy the separation condition of target separation, and step 206 is performed, that is, the indicator is controlled to continuously cling to the target; and when the movement distance by which the player operates the joystick to move exceeds the separation distance, it is considered that the indicator satisfies the separation condition of target separation, and step 208 is performed.

Step 208: Control the indicator to separate from the target.

Herein, when the indicator satisfies the separation condition of target separation, the indicator is controlled not to cling to the target and controlled to present at a default position in the virtual scene, and the default position may be a position having a fixed relative position relationship with a virtual object controlled by the player, or may be a fixed position in the virtual scene.

2. Direction Type Skill

Figure 10:
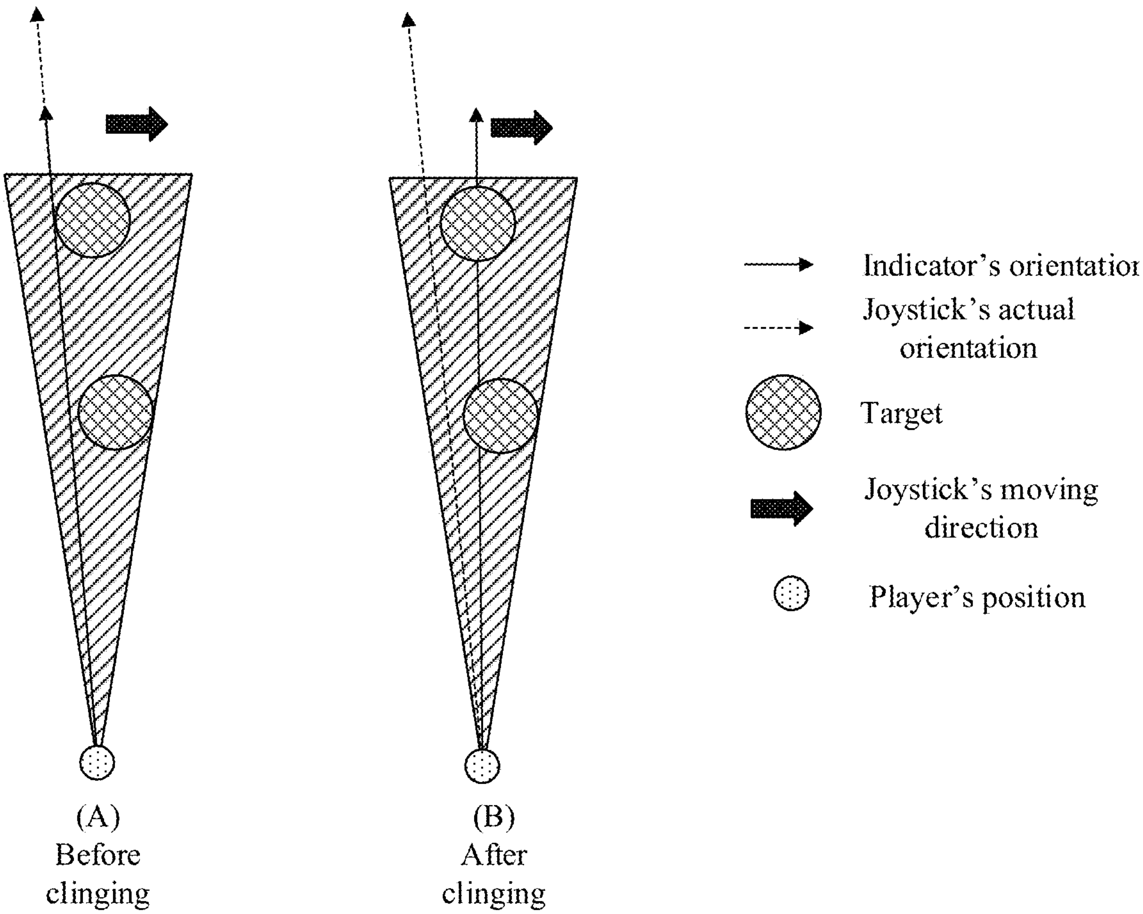
FIG. 10 is a principle schematic diagram that an indicator clings to a target according to an embodiment of the present disclosure.

FIG. 10 is a principle schematic diagram that an indicator clings to a target according to an embodiment of the present disclosure. Before an automatic clinging aiming function is triggered, the indicator and a joystick are consistent in orientation (FIG. A); and after the automatic clinging aiming function is triggered, the actual orientation of the joystick does not change, but the orientation of the indicator deviates from the orientation of the joystick and coincides with a center point of the target (FIG. B), that is, the indicator is controlled to cling to the target. An automatic clinging process almost happens at a moment, the player will see that the indicator suddenly aims at the target, and regardless of vision or hand feeling, feedback is very obvious.

Figure 11:
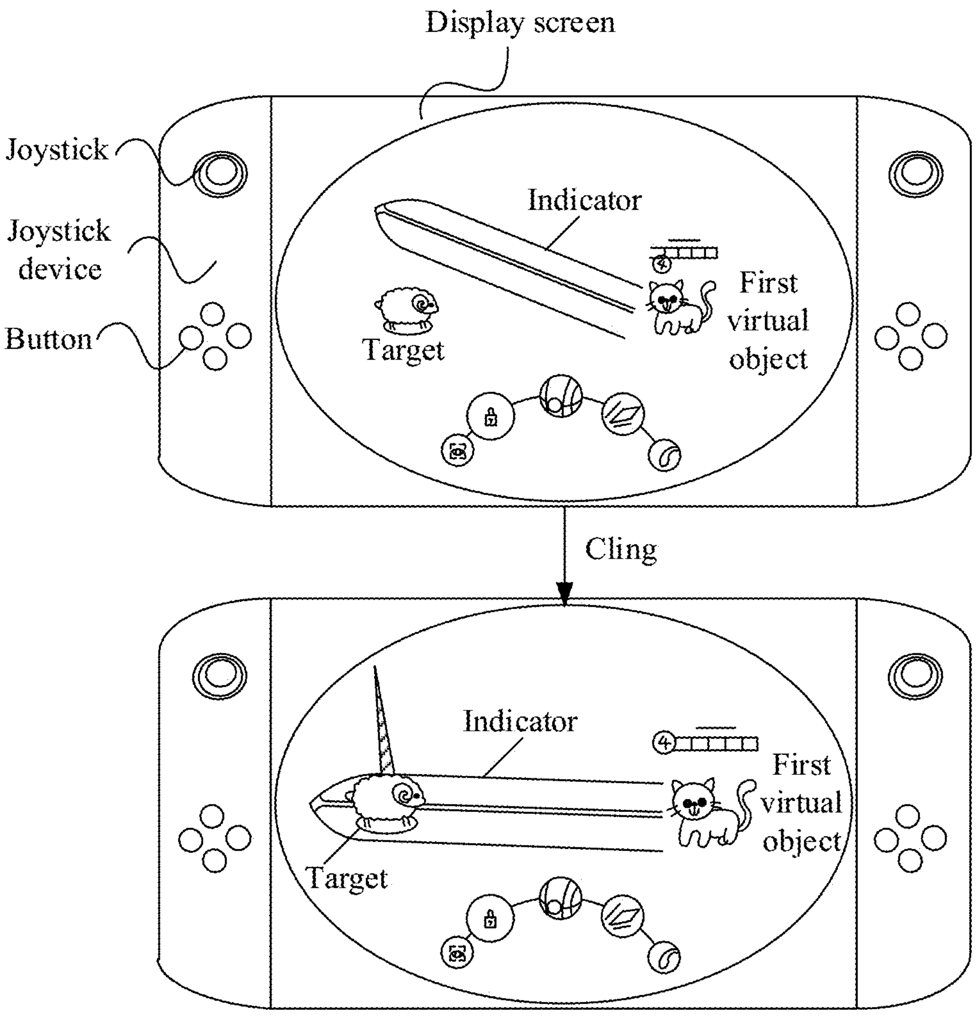
FIG. 11 is a display interface schematic diagram that an indicator clings to a target according to an embodiment of the present disclosure.

FIG. 11 is a display interface schematic diagram that an indicator clings to a target according to an embodiment of the present disclosure. When the player presses, by a joystick device on a game console, a button corresponding to the direction type skill, the game console renders, in response to the press operation on the button, a first virtual object and the indicator of the direction type skill in a display screen, and when the player controls, by the joystick device, the indicator to move, if the target is located within a clinging angle area (e.g., the target area), the indicator is controlled to cling to the target, and in the process that the indicator clings to the target, even when at least one of the player, the target and a joystick moves, the indicator is controlled to continuously cling to the target as long as the target is still in the clinging angle area; and when the target is not within the clinging angle area, the indicator is controlled not to cling to the target, and controlled to present at a relative position relative to the player.

Figure 12:
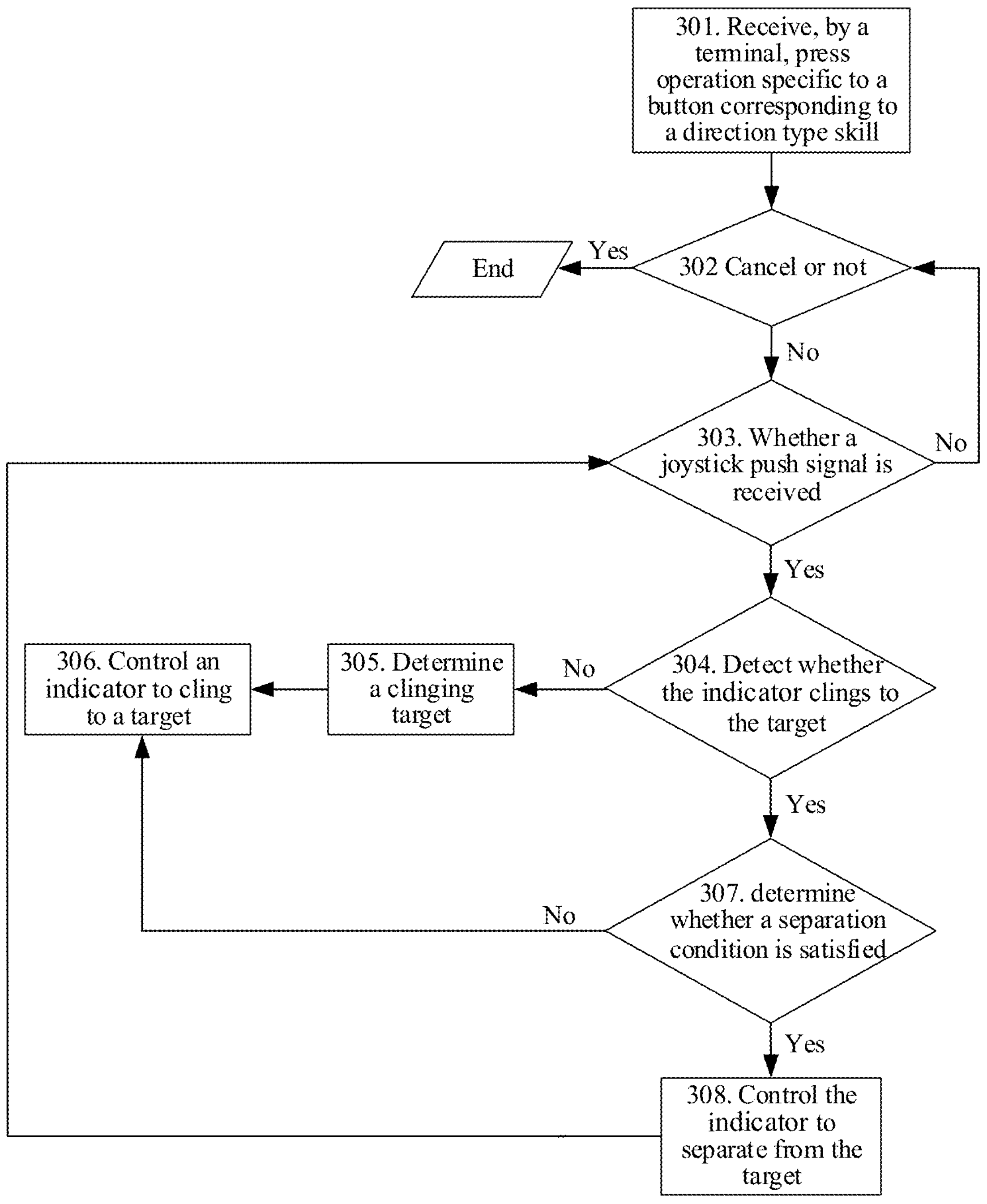
FIG. 12 is a schematic flowchart of a method for controlling virtual skills in a virtual scene according to an embodiment of the present disclosure.

FIG. 12 is a schematic flowchart of a method for controlling virtual skills in a virtual scene according to an embodiment of the present disclosure, and a process of applying the method to the direction type skill is described in combination with FIG. 12 below.

Step 301: Receive, by a game console, a press operation specific to a button corresponding to the direction type skill.

Herein, when the player presses the button, corresponding to the direction type skill, in a joystick device, the game console determines, in response to the press operation, the direction type skill selected by the player, and renders an indicator corresponding to the direction type skill in a display screen.

Step 302: Detect whether the direction type skill is canceled or not.

Herein, in some embodiments, whether the direction type skill is canceled or not can be judged by detecting whether the player triggers a button, for canceling the direction type skill, in the joystick device or not, and when the direction type skill is canceled, the process is ended; and when the direction type skill is not canceled, step 303 is performed.

Step 303: Detect whether a joystick push signal is received or not.

Herein, in some embodiments, whether the joystick push signal is received or not can be judged by detecting whether the player pushes and presses the joystick in the joystick device or not, and when the joystick push signal is received, step 304 is performed; and if not, step 302 is performed.

Step 304: Detect whether the indicator clings to the target or not.

Herein, when the indicator does not cling to the target, step 305 is performed; and if not, step 306 is performed.

Step 305: Determine a target for clinging.

Figure 13:
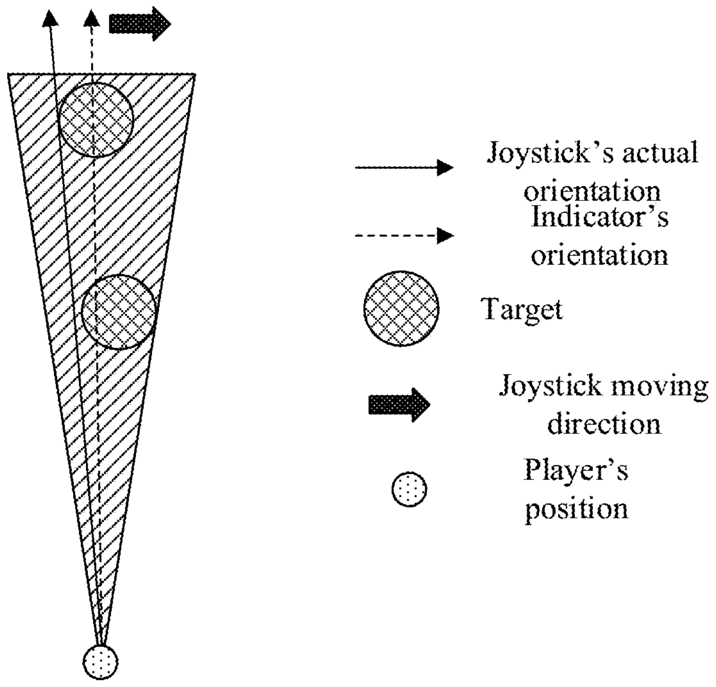
FIG. 13 is a schematic diagram of determining a clinging target according to an embodiment of the present disclosure.

FIG. 13 is a schematic diagram of determining a target for clinging according to an embodiment of the present disclosure. A turn area corresponding to a direction of pushing a joystick by the player is searched for a target from an indicator position, and when there are a plurality of targets in the turn area, a target forming a minimum included angle (the angle is required to be greater than 0) with an indicator is selected as the target for clinging.

Step 306: Control the indicator to cling to the target.

Step 307: Judge whether a separation condition is satisfied or not.

Herein, when a movement angle by which the player operates the joystick to move is less than an angle threshold (e.g., the clinging angle), it is considered that the indicator does not satisfy the separation condition of target separation, and step 306 is performed, that is, the indicator is controlled to continuously cling to the target; and when the movement angle by which the player operates the joystick to move exceeds the angle threshold, it is considered that the indicator satisfies the separation condition of target separation, and step 308 is performed.

Step 208: Control the indicator to separate from the target.

Herein, when the indicator satisfies the separation condition of target separation, the indicator is controlled not to cling to the target and controlled to present at a default position relative to the player.

The joystick device controls the moving direction of the indicator, and in the moving process of the indicator, when the target is located in the target area where the automatic clinging aiming function can be triggered, the indicator is controlled to automatically cling to the target, thereby greatly improving the aiming efficiency, human-computer interaction efficiency and a hardware resource utilization rate, improving aiming confirmation feeling and hand feeling, reducing operation discomfort when the MOBA is played on the game console, helping a new player to more successfully get through a new hand period, and improving a retention ratio of the player specific to the game console.

Figure 14:
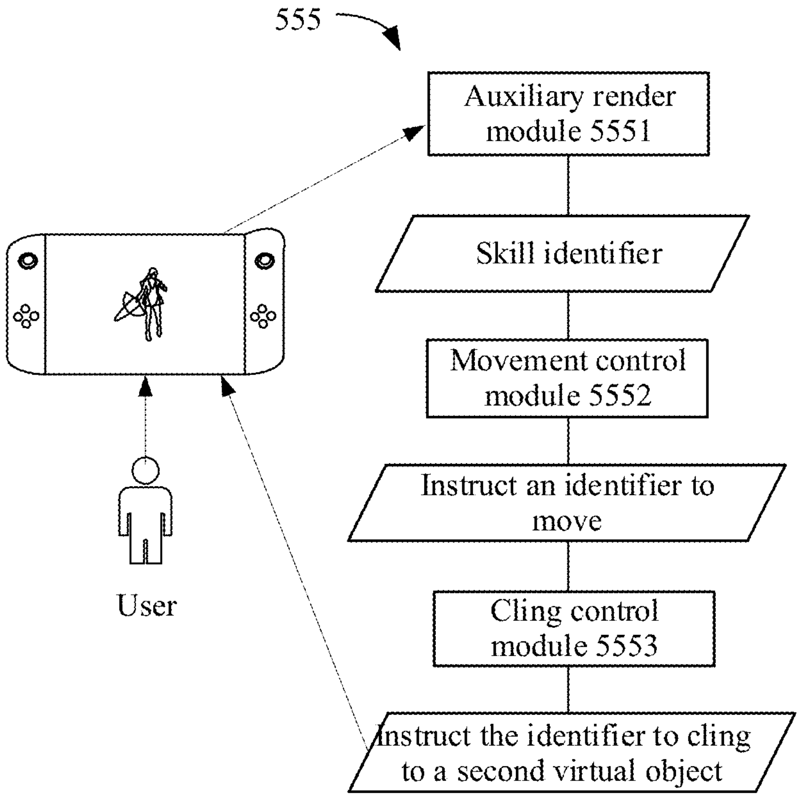
FIG. 14 is a structural schematic diagram of an apparatus for controlling virtual skills in a virtual scene according to an embodiment of the present disclosure.

An exemplary structure of a software module implemented in an apparatus 555 for controlling virtual skills in a virtual scene according to an embodiment of the present disclosure is continuously described. FIG. 14 is a structural schematic diagram of an apparatus for controlling virtual skills in a virtual scene according to an embodiment of the present disclosure. The software module in the apparatus 555 for controlling virtual skills in a virtual scene stored in the memory 550 in FIG. 3 may include:

an auxiliary render module 5551, configured to render a first virtual object/and a skill identifier of a virtual skill of the first virtual object in the virtual scene;

a movement control module 5552, configured to control, in response to a moving instruction for the skill identifier, the skill identifier to move in the virtual scene, where the moving instruction is triggered by a joystick device; and a cling control module 5553, configured to: in a moving process of the skill identifier, when a second virtual object exists in a target area, control the skill identifier to cling to the second virtual object, and when the virtual skill is released in the process of the skill identifier clinging to the second virtual object, control the virtual skill to act on the second virtual object.

In some embodiments, the apparatus further includes:

a determining module configured to acquire a circumference area with a location of the skill identifier as a circle center and a target distance as a radius, and determine the circumference area as the target area; and acquire a distance between the location of the skill identifier and a location of the second virtual object, and when the distance does not exceed the radius, determine that the second virtual object exists in the target area corresponding to the virtual skill.

In some embodiments, the apparatus further includes:

a continuous cling control module, configured to control, in response to a displacement instruction for the first virtual object, the first virtual object to move in the virtual scene; and in the moving process of the first virtual object, acquire a distance between the first virtual object and the second virtual object, and when the distance does not exceed a distance threshold, control the skill identifier to continuously cling to the second virtual object.

In some embodiments, the apparatus further includes:

a cling separation module, configured to control the skill identifier to separate from the second virtual object when the distance exceeds the distance threshold, and control the skill identifier to present at a default position in the virtual scene.

In some embodiments, the determining module is further configured to acquire a fan-shaped area with a location of the first virtual object as a circle center, a target distance as a radius and a target angle as a central angle, and determine the fan-shaped area as a target area corresponding to the virtual skill;

acquire a first connecting line between the first virtual object and the skill identifier, and a second connecting line between the first virtual object and the second virtual object; and acquire an included angle between the first connecting line and the second connecting line, and when the included angle does not exceed an included angle threshold and a length of the second connecting line does not exceed a length threshold, determine that the second virtual object exists in a target area corresponding to the virtual skill.

In some embodiments, the movement control module is further configured to control, in response to a moving instruction for the skill identifier, the skill identifier to move with a target angular speed.

In some embodiments, the displacement instruction may be triggered by a joystick device, and may also be triggered by touch operation on a screen of a display device; and in a moving process of a skill identifier with a target angular speed, the skill identifier can move towards a target position indicated by a moving instruction and/or a moving operation.

The apparatus further includes: a speed adjustment module, configured to receive an angular speed adjustment instruction for the skill identifier, where the angular speed adjustment instruction is triggered by pushing the joystick device in an orientation indicated by the skill identifier; and in response to the angular speed adjustment instruction, when a joystick of the joystick device is inconsistent with the skill identifier in orientation, adjust a rotation target angular speed of the skill identifier so as to control the skill identifier to rotate according to the adjusted target angular speed until the joystick is consistent with the skill identifier in orientation.

In some embodiments, the continuous cling control module is further configured to control, in response to a displacement instruction triggered based on the joystick device for the first virtual object, the first virtual object to move in the virtual scene;

update a target area corresponding to the virtual skill along with the movement of the first virtual object; and control the skill identifier to continuously cling to the second virtual object when the second virtual object still exists in the updated target area.

In some embodiments, the apparatus further includes:

a cling switch module, configured to: when the second virtual object does not exist in an updated target area and a third virtual object different from the second virtual object exists, control, through switchover, the skill identifier to cling to the third virtual object from the second virtual object.

In some embodiments, the cling separation module is further configured to receive a separation instruction sent by the joystick device for the second virtual object in the process that the skill identifier clings to the second virtual object, where the separation instruction is triggered based on push operation specific to the joystick device, and through the push operation, a distance between a theoretical moving position of the skill identifier and the second virtual object reaches a distance threshold; and control, in response to the separation instruction, the skill identifier to separate from the second virtual object.

In some embodiments, the apparatus further includes:

an identifier control module, configured to display a picture that the second virtual object moves in the virtual scene;

in the displaying process of the picture, when the second virtual object exists in a target area corresponding to the virtual skill, control the skill identifier to continuously cling to the second virtual object; and when the second virtual object moves out of the target area corresponding to the virtual skill, control the skill identifier to separate from the second virtual object.

In some embodiments, the cling separation module is further configured to display a picture that the second virtual object moves in the virtual scene;

in the displaying process of the picture, control the skill identifier to move along with the second virtual object; and in the moving process of the skill identifier along with the second virtual object, control the skill identifier to separate from the second virtual object when a distance between the first virtual object and the second virtual object exceeds a distance threshold.

In some embodiments, the continuous cling control module is further configured to display a picture that the second virtual object moves in the virtual scene;

in the displaying process of the picture, render instruction information for indicating a moving path of the second virtual object; and based on the instruction information, control, in response to a moving instruction triggered based on the joystick device for the skill identifier, the skill identifier to move according to the moving path indicated by the instruction information, so that the skill identifier continuously clings to the second virtual object.

In some embodiments, the cling control module is further configured to: when there are a plurality of second virtual objects, respectively acquire distances between a location of the skill identifier and locations of the second virtual objects; and select the second virtual object with a distance less than a target distance, and control the skill identifier to cling to the selected second virtual object.

In some embodiments, the cling control module is further configured to: when there are a plurality of second virtual objects, respectively acquire attribute values of the second virtual objects; and select the second virtual object with the attribute value less than a target attribute value, and control the skill identifier to cling to the selected second virtual object.

In some embodiments, the apparatus further includes:

a skill release module, configured to control, in response to a release instruction triggered based on the joystick device for the virtual skill, the first virtual object to release the virtual skill at a movement target position or in the moving direction, so that the released virtual skill acts on the second virtual object.

An embodiment of the present disclosure provides a computer program product or a computer program. The computer program product or the computer program includes computer instructions stored in a computer-readable storage medium. A processor of a computer device reads the computer instructions from the computer-readable storage medium, and the processor executes the computer instructions, so that the computer device performs the disclosed method for controlling virtual skills in a virtual scene according to the embodiment of the present disclosure.

An embodiment of the present disclosure provides a computer-readable storage medium storing executable instructions. The executable instructions are stored, and when the executable instructions are executed by a processor, the processor executes the method for controlling virtual skills in a virtual scene according to the embodiment of the present disclosure.

In some embodiments, a computer-readable storage medium may be a memory such as a failure rate assessment machine (FRAM), a ROM, a programmable read-only memory (PROM), an erasable programmable read-only memory (EPROM), an electrically erasable programmable read-only memory (EEPROM), a flash memory, a magnetic surface memory, an optical disk, or a compact disc read-only memory (CD-ROM); and may also be various devices including any one or any combination of the memories.

In some embodiments, executable instructions may be compiled in the form of a program, software, a software module, a script or code according to any form of programming languages (including a compiled or interpretive language, or a declarative or procedural language), and can be deployed according to any form, which can be deployed as independent programs, or modules, components, subroutines or other units suitable for being used in the computing environment.

As an example, the executable instructions may correspond to but not necessarily correspond to files in a file system and can be stored as a part of a file storing other programs or data, for example, the executable instructions are stored in one or more scripts of a Hyper Text Markup Language (HTML) document, or a single file dedicated to discussed programs, or a plurality of collaborative files (e.g., a file storing one or more modules, subprograms or part of code).

As an example, the executable instructions can be deployed to be executed on one computing device, or a plurality of computing devices at one place, or a plurality of computing devices distributed in several places and connected through a communication network.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The embodiments of the present disclosure have the following beneficial effects. When the joystick device controls the skill identifier to move in the virtual scene and the second virtual object exists in the target area of the virtual skill, the skill identifier is controlled to cling to the second virtual object, and when the virtual skill is released in the process of the skill identifier clinging to the second virtual object, the virtual skill is controlled to act on the second virtual object; and accordingly, the joystick device controls the skill identifier to automatically cling to a target, thereby realizing accurate aiming at the target, improving aiming precision, then, greatly reducing the interaction frequency of players executing interactive operation for the aiming purpose, improving the human-computer interaction efficiency and the hardware resource utilization rate, and meanwhile bringing experience of more sense of control to users.

The foregoing descriptions are merely embodiments of the present disclosure and are not intended to limit the scope of protection of the present disclosure. Any modification, equivalent replacement, improvements, etc. made within the spirit and scope of the present disclosure shall fall within the scope of protection of the present disclosure.

What is claimed is:

1. A method for controlling virtual skills in a virtual scene, executed by an electronic device, comprising:

rendering a first virtual object and a skill identifier of a virtual skill of the first virtual object in the virtual scene;

controlling, in response to a moving instruction for the skill identifier, the skill identifier to move in the virtual scene, the moving instruction being triggered by a joystick device;

during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object, wherein controlling, in response to the moving instruction for the skill identifier, the skill identifier to move in the virtual scene comprises:

controlling, in response to the moving instruction for the skill identifier, the skill identifier to move in the virtual scene with a target angular speed, and wherein after the controlling of the skill identifier to cling to the second virtual object, the method further comprises:

receiving an angular speed adjustment instruction for the skill identifier, the angular speed adjustment instruction being triggered by pushing the joystick device in an orientation indicated by the skill identifier;

adjusting, in response to the angular speed adjustment instruction, a rotation target angular speed of the skill identifier when the joystick device is inconsistent with the skill identifier in orientation; and controlling the skill identifier to rotate according to the adjusted target angular speed until the joystick device is consistent with the skill identifier in orientation.

2. The method according to claim 1, further comprising:

acquiring a circumference area with a location of the skill identifier as a circle center and a target distance as a radius, and determining the circumference area as the target area; and acquiring a distance between the location of the skill identifier and a location of the second virtual object, and determining that the second virtual object exists in the target area corresponding to the virtual skill when the distance does not exceed the radius.

3. The method according to claim 2, further comprising:

controlling, in response to a displacement instruction for the first virtual object, the first virtual object to move in the virtual scene; and acquiring a distance between the first virtual object and the second virtual object in a moving process of the first virtual object, and controlling the skill identifier to continuously cling to the second virtual object when the distance does not exceed a distance threshold.

4. The method according to claim 3, further comprising:

controlling the skill identifier to separate from the second virtual object when the distance exceeds the distance threshold, and controlling the skill identifier to present at a default position in the virtual scene.

5. The method according to claim 1, further comprising:

acquiring a fan-shaped area with a location of the first virtual object as a circle center, a target distance as a radius and a target angle as a central angle, and determining the fan-shaped area as the target area;

acquiring a first connecting line between the first virtual object and the skill identifier, and a second connecting line between the first virtual object and the second virtual object; and acquiring an included angle between the first connecting line and the second connecting line, and determining that the second virtual object exists in the target area when the included angle does not exceed an included angle threshold and a length of the second connecting line does not exceed a length threshold.

6. The method according to claim 1, further comprising:

controlling, in response to a displacement instruction for the first virtual object, the first virtual object to move in the virtual scene;

updating the target area along with the moving of the first virtual object; and controlling the skill identifier to continuously cling to the second virtual object when the second virtual object still exists in the updated target area.

7. The method according to claim 6, further comprising:

when the second virtual object does not exist in the updated target area and a third virtual object different from the second virtual object exists, controlling, through switchover, the skill identifier to cling to the third virtual object from the second virtual object.

8. The method according to claim 1, further comprising:

receiving a separation instruction for the second virtual object in a process the skill identifier clinging to the second virtual object, the separation instruction being triggered based on a push operation specific to the joystick device, and through the push operation, a distance between a moving position of the skill identifier and the second virtual object reaching a distance threshold; and controlling, in response to the separation instruction, the skill identifier to separate from the second virtual object.

9. The method according to claim 1, further comprising:

displaying a picture that the second virtual object moves in the virtual scene;

controlling the skill identifier to continuously cling to the second virtual object when the second virtual object exists in the target area when displaying the picture; and controlling the skill identifier to separate from the second virtual object when the second virtual object moves out of the target area.

10. The method according to claim 1, further comprising:

displaying a picture that the second virtual object moves in the virtual scene;

controlling the skill identifier to move along with the second virtual object when displaying the picture; and in the moving process of the skill identifier along with the second virtual object, controlling the skill identifier to separate from the second virtual object when a distance between the first virtual object and the second virtual object exceeds a distance threshold.

11. The method according to claim 1, further comprising:

displaying a picture that the second virtual object moves in the virtual scene;

providing instruction information when displaying the picture, the instruction information being used for indicating a moving path of the second virtual object; and controlling, based on the instruction information, the skill identifier to move according to the moving path, in response to the moving instruction for the skill identifier.

12. The method according to claim 1, wherein the controlling of the skill identifier to cling to the second virtual object, comprises:

when there are a plurality of second virtual objects, respectively acquiring distances between the skill identifier and the second virtual objects; and selecting the second virtual object with a distance less than a target distance, and controlling the skill identifier to cling to the selected second virtual object.

13. The method according to claim 1, wherein the controlling of the skill identifier to cling to the second virtual object, comprises:

when there are a plurality of second virtual objects, respectively acquiring attribute values of the second virtual objects; and selecting the second virtual object with the attribute value less than a target attribute value, and controlling the skill identifier to cling to the selected second virtual object.

14. The method according to claim 1, further comprising:

controlling, in response to a release instruction for the virtual skill, the first virtual object to release the virtual skill at a target position; or, controlling the first virtual object to release the virtual skill in the moving direction.

15. An electronic device, comprising:

a memory, configured to store executable instructions; and a processor, configured to execute the executable instructions stored in the memory to implement a method for controlling virtual skills in a virtual scene, the method comprising:

rendering a first virtual object and a skill identifier of a virtual skill of the first virtual object in the virtual scene;

controlling, in response to a moving instruction for the skill identifier, the skill identifier to move in the virtual scene, the moving instruction being triggered by a joystick device;

during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object, wherein controlling, in response to the moving instruction for the skill identifier, the skill identifier to move in the virtual scene comprises:

controlling, in response to the moving instruction for the skill identifier, the skill identifier to move in the virtual scene with a target angular speed, and wherein after the controlling of the skill identifier to cling to the second virtual object, the method further comprises:

receiving an angular speed adjustment instruction for the skill identifier, the angular speed adjustment instruction being triggered by pushing the joystick device in an orientation indicated by the skill identifier;

adjusting, in response to the angular speed adjustment instruction, a rotation target angular speed of the skill identifier when the joystick device is inconsistent with the skill identifier in orientation; and controlling the skill identifier to rotate according to the adjusted target angular speed until the joystick device is consistent with the skill identifier in orientation.

16. The electronic device according to claim 15, wherein the method further comprises:

acquiring a circumference area with a location of the skill identifier as a circle center and a target distance as a radius, and determining the circumference area as the target area; and acquiring a distance between the location of the skill identifier and a location of the second virtual object, and determining that the second virtual object exists in the target area corresponding to the virtual skill when the distance does not exceed the radius.

17. The electronic device according to claim 16, wherein the method further comprises:

controlling, in response to a displacement instruction for the first virtual object, the first virtual object to move in the virtual scene; and acquiring a distance between the first virtual object and the second virtual object in a moving process of the first virtual object, and controlling the skill identifier to continuously cling to the second virtual object when the distance does not exceed a distance threshold.

18. The electronic device according to claim 17, wherein the method further comprises:

controlling the skill identifier to separate from the second virtual object when the distance exceeds the distance threshold, and controlling the skill identifier to present at a default position in the virtual scene.

19. A non-transitory computer-readable storage medium, storing executable instructions which are executed by a processor to implement a method for controlling virtual skills in a virtual scene, the method comprising:

rendering a first virtual object and a skill identifier of a virtual skill of the first virtual object in the virtual scene;

controlling, in response to a moving instruction for the skill identifier, the skill identifier to move in the virtual scene, the moving instruction being triggered by a joystick device;

during a moving process of the skill identifier, when a second virtual object exists in a target area, controlling the skill identifier to cling to the second virtual object; and controlling the virtual skill to act on the second virtual object when the virtual skill is released in a process of the skill identifier clinging to the second virtual object, wherein controlling, in response to the moving instruction for the skill identifier, the skill identifier to move in the virtual scene comprises:

controlling, in response to the moving instruction for the skill identifier, the skill identifier to move in the virtual scene with a target angular speed, and wherein after the controlling of the skill identifier to cling to the second virtual object, the method further comprises:

receiving an angular speed adjustment instruction for the skill identifier, the angular speed adjustment instruction being triggered by pushing the joystick device in an orientation indicated by the skill identifier;

adjusting, in response to the angular speed adjustment instruction, a rotation target angular speed of the skill identifier when the joystick device is inconsistent with the skill identifier in orientation; and controlling the skill identifier to rotate according to the adjusted target angular speed until the joystick device is consistent with the skill identifier in orientation.

* * * * *